(12) United States Patent
Nakanishi

(10) Patent No.: US 9,141,235 B2
(45) Date of Patent: Sep. 22, 2015

(54) OPTICAL POSITION DETECTING DEVICE AND DISPLAY DEVICE WITH POSITION DETECTING FUNCTION

(75) Inventor: Daisuke Nakanishi, Matsumoto (JP)

(73) Assignee: Seiko Epson Corporation (JP)

( * ) Notice: Subject to any disclaimer, the term of this patent is extended or adjusted under 35 U.S.C. 154(b) by 883 days.

(21) Appl. No.: 12/885,647

(22) Filed: Sep. 20, 2010

(65) Prior Publication Data

US 2011/0096032 A1  Apr. 28, 2011

(30) Foreign Application Priority Data

Oct. 26, 2009 (JP) .................................. 2009-245196

(51) Int. Cl.
*G06F 3/042* (2006.01)

(52) U.S. Cl.
CPC ............ *G06F 3/0428* (2013.01); *G06F 3/0425* (2013.01)

(58) Field of Classification Search
CPC ... G06F 3/0425; G06F 3/0416; G06F 3/0421; G06F 3/0426; G06F 3/0428; H04N 9/3185
USPC ............ 345/7, 156–176, 419, 621, 204, 422; 250/208.1, 221, 205, 559.38; 257/59; 353/69, 37; 248/266; 348/222.1; 356/51, 621; 600/324; 715/48; 463/31
See application file for complete search history.

(56) References Cited

U.S. PATENT DOCUMENTS

| | | | | |
|---|---|---|---|---|
| 4,553,842 A * | 11/1985 | Griffin | ........................... | 356/621 |
| 6,429,856 B1 * | 8/2002 | Omura et al. | ................. | 345/175 |
| 6,628,270 B2 * | 9/2003 | Sekiguchi et al. | ............ | 345/173 |
| 6,927,384 B2 | 8/2005 | Reime et al. | | |
| 7,210,791 B2 | 5/2007 | Vinson et al. | | |
| 7,265,748 B2 | 9/2007 | Ryynanen | | |
| 7,278,745 B2 | 10/2007 | Engle | | |
| 7,325,933 B2 | 2/2008 | Kaise et al. | | |
| 7,367,537 B2 | 5/2008 | Ibe | | |
| 7,525,536 B2 * | 4/2009 | Kobayashi | ..................... | 345/173 |
| 7,566,853 B2 * | 7/2009 | Tuckerman et al. | ........ | 250/208.1 |
| 7,701,439 B2 * | 4/2010 | Hillis et al. | ................... | 345/156 |
| 7,864,341 B2 | 1/2011 | Kobayashi | | |
| 8,038,303 B2 | 10/2011 | Inoue | | |
| 8,070,297 B2 | 12/2011 | Kamijima | | |
| 8,149,324 B2 | 4/2012 | Oikawa | | |
| 8,508,506 B2 * | 8/2013 | Onishi | .......................... | 345/175 |
| 2001/0052581 A1 * | 12/2001 | Bohn | ........................ | 250/559.38 |

(Continued)

FOREIGN PATENT DOCUMENTS

| | | |
|---|---|---|
| CN | 101 206 550 A | 6/2008 |
| JP | 2001-142643 | 5/2001 |

(Continued)

*Primary Examiner* — Dwayne Bost
*Assistant Examiner* — Darlene M Ritchie
(74) *Attorney, Agent, or Firm* — Harness, Dickey & Pierce, P.L.C.

(57) ABSTRACT

An optical position detecting apparatus that detects a position of a target object in a detection region, includes: a light source device for position detection that emits position detection light to the detection region and forms an intensity distribution of the position detection light in the detection region; plural photodetectors that direct incident angle ranges to regions not overlapping one another in the detection region; and a position detecting device that detects the position of the target object on the basis of results of detection by the photodetectors of the position detection light reflected on the target object.

7 Claims, 16 Drawing Sheets

(56) References Cited

U.S. PATENT DOCUMENTS

| | | |
|---|---|---|
| 2002/0075240 A1* | 6/2002 | Lieberman et al. ........... 345/170 |
| 2002/0075243 A1* | 6/2002 | Newton ......................... 345/173 |
| 2004/0061838 A1 | 4/2004 | Mochizuki et al. |
| 2004/0108990 A1 | 6/2004 | Lieberman et al. |
| 2005/0024324 A1* | 2/2005 | Tomasi et al. ................. 345/156 |
| 2005/0035943 A1* | 2/2005 | Kojima .......................... 345/156 |
| 2005/0046804 A1 | 3/2005 | Akutsu |
| 2005/0122308 A1* | 6/2005 | Bell et al. ...................... 345/156 |
| 2005/0128190 A1* | 6/2005 | Ryynanen ..................... 345/173 |
| 2006/0044282 A1* | 3/2006 | Pinhanez et al. ............. 345/173 |
| 2007/0046625 A1* | 3/2007 | Yee ................................ 345/156 |
| 2008/0150915 A1 | 6/2008 | Shibue et al. |
| 2008/0259051 A1* | 10/2008 | Ota ................................ 345/175 |
| 2008/0259288 A1 | 10/2008 | Murata |
| 2008/0316324 A1 | 12/2008 | Rofougaran et al. |
| 2009/0066662 A1* | 3/2009 | Liu et al. ....................... 345/173 |
| 2009/0091710 A1 | 4/2009 | Huebner |
| 2009/0115721 A1* | 5/2009 | Aull et al. ..................... 345/156 |
| 2009/0141002 A1* | 6/2009 | Sohn et al. .................... 345/175 |
| 2009/0213093 A1* | 8/2009 | Bridger ......................... 345/175 |
| 2009/0251685 A1 | 10/2009 | Bell |
| 2009/0262075 A1* | 10/2009 | Kimmel et al. ............... 345/163 |
| 2010/0013763 A1* | 1/2010 | Futter et al. ................... 345/158 |
| 2010/0149096 A1* | 6/2010 | Migos et al. .................. 345/158 |
| 2010/0245289 A1* | 9/2010 | Svajda ........................... 345/175 |
| 2011/0291988 A1* | 12/2011 | Bamji et al. .................. 345/175 |
| 2012/0068974 A1* | 3/2012 | Ogawa .......................... 345/175 |
| 2014/0320459 A1* | 10/2014 | Pettersson et al. ............ 345/175 |

FOREIGN PATENT DOCUMENTS

| | | |
|---|---|---|
| JP | 2005-258292 A | 9/2005 |
| JP | 2007-048135 A | 2/2007 |
| JP | 2007514242 A | 5/2007 |
| JP | 2010-198083 | 9/2010 |
| JP | 2010-198548 | 9/2010 |
| WO | WO-2005057399 A2 | 6/2005 |

\* cited by examiner

OPTICAL POSITION DETECTING DEVICE AND DISPLAY DEVICE WITH POSITION DETECTING FUNCTION

BACKGROUND

1. Technical Field

The present invention relates to an optical position detecting apparatus that optically detects the position of a target object in a detection region and a display device with position detecting function including the optical position detecting apparatus.

2. Related Art

In recent years, in electronic apparatuses such as a car navigation system, a personal computer, a ticket machine, and a bank terminal, a display device with position detecting function in which a touch panel is arranged on a front surface of an image generating device such as a liquid crystal device is used. In such a display device with position detecting function, a user inputs information while referring to an image displayed on the image generating device. Such a touch panel is configured as an optical position detecting apparatus for detecting the position of a target object in a detection region (see, for example, U.S. Pat. No. 6,927,384).

The optical position detecting apparatus described in U.S. Pat. No. 6,927,384 is an optical type. A light transmitting plate is provided on an input operation side with respect to a direct-view display panel such as a liquid crystal panel. A light source, a light receiving element, and the like are arranged on the opposite side of the input operation side with respect to the light transmitting plate. Position detection light emitted from the light source is emitted to the input operation side via the light transmitting plate and the position detection light reflected on the target object is received by the light receiving element.

The inventor proposes, for example, an optical position detecting apparatus schematically shown in FIGS. 16A and 16B making practical use of the technique described in U.S. Pat. No. 6,927,384. In the optical position detecting apparatus having such a configuration, light sources for position detection 12 (light sources for position detection 12A to 12D) form an intensity distribution of position detection lights in an in-plane direction of a detection region 10R. A photodetector apparatus 15 detects the position detection lights reflected by a target object Ob in the detection region 10R. A light intensity distribution of position detection light emitted from a light guide plate 13 to the detection region 10R is different between the time when position detection light L2a is emitted from the light source for position detection 12A and the time when position detection light L2b is emitted from the light source for position detection 12B. Therefore, if light reception results in the photodetector apparatus 15 at the time when the position detection light L2a is emitted and at the time when the position detection light L2b is emitted are compared, the position of the target object Ob in a direction indicated by an arrow A can be detected. If light reception results in the photodetector apparatus 15 at the time when position detection light L2c is emitted from the light source for position detection 12C and at the time when position detection light L2d is emitted from the light source for position detection 12D are compared, the position of the target object Ob in a direction indicated by an arrow B can be detected.

However, in the optical position detecting apparatus having the configuration shown in FIGS. 16A and 16B, the position of the target object Ob is detected according to one physical value (light reception intensity) detected by the photodetector apparatus 15. Therefore, when plural target objects Ob are present in the detection region 10R and a light reception amount in the photodetector apparatus 15 increases, the optical position detecting apparatus detects in error that the positions of the target objects Ob are closer to the light sources for position detection 12 than actual positions of the target objects Ob. The configuration shown in FIGS. 16A and 16B is a reference example of the invention and is not a related art.

SUMMARY

An advantage of some aspects of the invention is to provide an optical position detecting apparatus that can accurately detect the position of a target object even when plural target objects are present in a detection region and a display device with position detecting function including such an optical position detecting apparatus.

According to an aspect of the invention, there is provided an optical position detecting apparatus that detects the position of a target object in a detection region. The optical position detecting apparatus includes: a light source device for position detection that emits position detection light to the detection region and forms an intensity distribution of the position detection light in the detection region; plural photodetectors that direct incident angle ranges to regions not overlapping one another in the detection region; and a position detecting device that detects the position of the target object on the basis of results of detection by the photodetectors of the position detection light reflected on the target object.

In the aspect of the invention, the light source device for position detection emits the position detection light to the detection region. The photodetectors detect the position detection light reflected by the target object in the detection region. The position detection light emitted from the light source device for position detection forms an intensity distribution in the detection region. Therefore, if a relation between a position in the detection region and the intensity of the position detection light is grasped in advance, the position detecting device can detect the position of the target object on the basis of light reception results of the photodetectors. Since the plural photodetectors that direct incident angle ranges to regions not overlapping one another in the detection region are used, it is possible to detect the position of the target object over the entire detection region. Further, since the incident angle ranges do not overlap one another in the plural photodetectors, it is possible to accurately detect the position of the target object. Specifically, if the incident angle ranges adjacent to each other overlap in the plural photodetectors, when the target object is located in a region where the incident angle ranges overlap, a situation occurs in which, regardless of the fact that the target object is one target object, the plural photodetectors detect light reflected on the target object. According to the aspect of the invention, it is possible to prevent such a situation. When the target object is present in the region where the incident angle ranges overlap, a situation occurs in which it cannot be distinguished whether the target object is a single target object or plural target objects. However, according to the aspect of the invention, it is possible to prevent such a situation.

In the aspect, the position detecting device may detect the position of the target object for each of the results of the detection by the plural photodetectors. With such a configuration, it is possible to detect the respective positions of plural target objects in the detection region without performing complicated processing.

In the aspect, ends of the incident angle ranges adjacent to each other may be close to or in contact with each other in the plural photodetectors. With such a configuration, it is possible to prevent a situation in which the presence of the target object is overlooked.

In the aspect, the photodetectors may include incident-angle-range limiting units that specify the incident angle ranges. With such a configuration, it is possible to arbitrarily adjust the incident angle ranges of the photodetectors.

In the aspect, the plural photodetectors may be arranged to be adjacent to one another in a specific place adjacent to the detection region. With such a configuration, it is possible to arrange the plural photodetectors in a narrow space around the detection region.

In the aspect, the plural photodetectors may be arranged in plural places adjacent to the detection region. With such a configuration, when plural target objects are present in the detection region, it is possible to detect the position of each of the plural target objects.

In the aspect, the position detection light may include infrared light. With such a configuration, there is an advantage that the position detection light is prevented from being visually recognized.

In the aspect, the light source device for position detection may form, as the intensity distribution, an intensity distribution for first coordinate detection in which the intensity of the position detection light changes in a first direction and an intensity distribution for second coordinate detection in which the intensity of the position detection light changes in a second direction crossing the first direction. With such a configuration, it is possible to detect two-dimensional coordinates of the target object.

In the aspect, the light source device for position detection may form, as the intensity distribution, an intensity distribution for third coordinate detection in which the intensity of the position detection light changes in a direction crossing both the first and second directions. With such a configuration, it is possible to detect three-dimensional coordinates of the target object.

The optical position detecting apparatus according to the aspect of the invention is used in, for example, a display device with position detecting function. In this case, the display device with position detecting function includes an image generating device that forms an image in a region overlapping the detection region. The display device with position detecting function according to the aspect is used in, besides various display apparatuses such as a projection display apparatus, electronic apparatuses such as a cellular phone, a car navigation system, a personal computer, a ticket machine, and a bank terminal.

BRIEF DESCRIPTION OF THE DRAWINGS

The invention will be described with reference to the accompanying drawings, wherein like numbers reference like elements.

DESCRIPTION OF EXEMPLARY
EMBODIMENTS

Figure 1A:
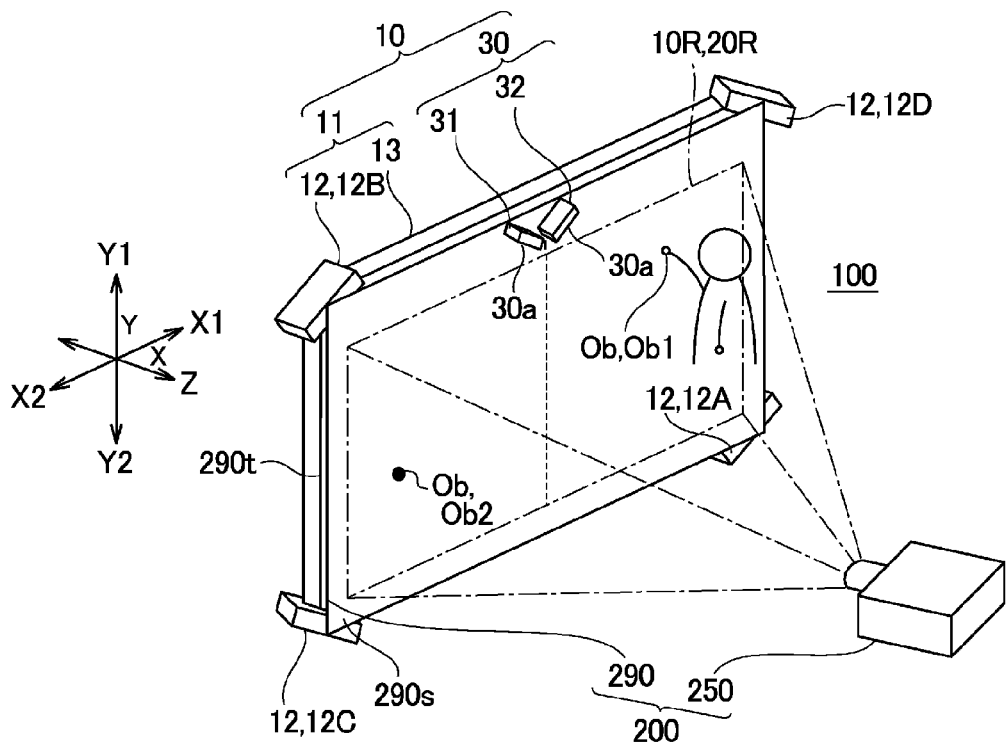
FIGS. 1A and 1B are explanatory diagrams schematically showing the configuration of an optical position detecting apparatus and a display device with position detecting function according to a first embodiment of the invention.
Figure 1B:
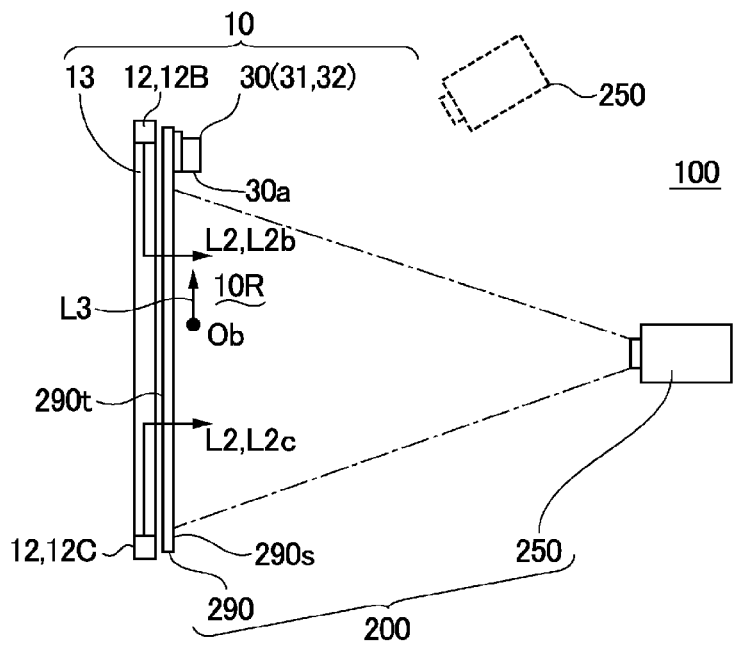

Embodiments of the invention are explained in detail below with reference to the accompanying drawings. In the following explanation, axes crossing one another are explained as an X axis, a Y axis, and a Z axis. In the drawings referred to below, for convenience of explanation, an X axis direction is represented as a lateral direction and a Y axis direction is represented as a longitudinal direction. In the drawings referred to below, one side of the X axis direction is shown as an X1 side, the other side of the X axis direction is shown as an X2 side, one side of the Y axis direction is shown as a Y1 side, and the other side of the Y axis direction is shown as a Y2 side. In the drawings referred to below, to show members in sizes recognizable on the drawings, scales are varied for each of the members.

Configuration of an Optical Position Detecting Apparatus and a Display Device with Position Detecting Function Overall Configuration of the Display Device with Position Detecting Function FIGS. 1A and 1B are explanatory diagrams schematically showing the configuration of an optical position detecting apparatus and a display device with position detecting function according to a first embodiment of the invention. FIG. 1A is an explanatory diagram schematically showing a state in which a main part of the display device with position detecting function is viewed from obliquely above. FIG. 1B is an explanatory diagram schematically showing a state in which the main part of the display device with position detecting function is viewed from the lateral direction.

A display device with position detecting function 100 shown in FIGS. 1A and 1B includes an optical position detecting apparatus 10 and an image generating device 200. When a user brings a target object Ob such as a finger close to a detection region 10R on the basis of an image displayed by the image generating device 200, the optical position detecting apparatus 10 detects two-dimensional positions (an X coordinate position and a Y coordinate position) of the target object Ob.

As explained in detail later, the optical position detecting apparatus 10 includes a light source device for position detection 11 including plural light sources for position detection 12 (light sources for position detection 12A to 12D) that emit position detection lights L2 including infrared lights and a photodetector 30 including a light receiving unit 30a faced to the detection region 10R. In this embodiment, the light source device for position detection 11 also includes a light guide plate 13 arranged in parallel to an XY plane. The photodetector 30 includes a light receiving element such as a photodiode or a phototransistor.

In this embodiment, the image generating device 200 is a projection type. The image generating device 200 includes a screen member 290 arranged to be superimposed on a front side (an input operation side) of the light guide plate 13 and an image projecting device 250 that expands display light and projects the display light to the side of a screen surface 290s on which an image is visually recognized in the screen member 290. The image generating device 200 sets a predetermined region of the screen member 290 as an image display region 20R. In this embodiment, the image display region 20R is a region generally overlapping the detection region 10R when viewed from a Z axis direction.

The detection region 10R of the optical position detecting apparatus 10 is set on a side on which the image projecting device 250 is located with respect to the screen member 290. The light guide plate 13 and the light sources for position detection 12 are arranged on a rear side 290t of the screen member 290. The photodetector 30 faces the light receiving unit 30a to a direction along the screen surface 290s on an outer side of the detection region 10R on the side of the screen surface 290s of the screen member 290.

In this embodiment, as the screen member 290, various kinds of members explained below can be used. All the members include materials that can transmit infrared light. First, as the screen member 290, a white screen made of cloth painted white on the surface or an embossed white vinyl material can be used. As the screen member 290, a silver screen colored in high silver color in order to improve reflectance of light can also be used. Further, as the screen member 290, a pearl screen with reflectance of light improved by applying resin treatment to a cloth surface or a piece screen with reflectance of light improved by applying fine glass powder to the surface can also be used. In the screen member 290, in some case, a black light blocking layer is formed on the rear side of a screen for the purpose of improving the quality of an image displayed on the screen. In such a case, if plural light transmitting sections including fine holes are formed in the light blocking layer, the screen member 290 has light transmitting properties for the position detection lights L2 including infrared lights. In an example shown in FIGS. 1A and 1B, the image projecting device 250 is arranged in the front of the screen member 290. However, in some case, the image projecting device 250 projects display light to the screen member 290 from an oblique direction as indicated by an alternate long and short dash line in FIG. 1B.

In the optical position detecting apparatus 10 and the display device with position detecting function 100 configured as explained above, when the light sources for position detection 12 emit the position detection lights L2 to the light guide plate 13, the position detection lights L2 are emitted from a light emission surface 13s of the light guide plate 13 to the screen member 290. Subsequently, the position detection lights L2 are transmitted through the screen member 290 and emitted to the detection region 10R. A part of position detection lights L3 reflected on the target object Ob of the detection region 10R is received by the photodetector 30. Therefore, XY coordinates of the target object Ob are detected based on a light reception result in the photodetector 30. Accordingly, the display device with position detecting function according to this embodiment can treat such XY coordinates of the target object Ob as input information for designating a part of a projected image and perform, for example, switching of the image on the basis of such input information.

Basic Configuration of the Optical Position Detecting Apparatus 10

Figure 2A:
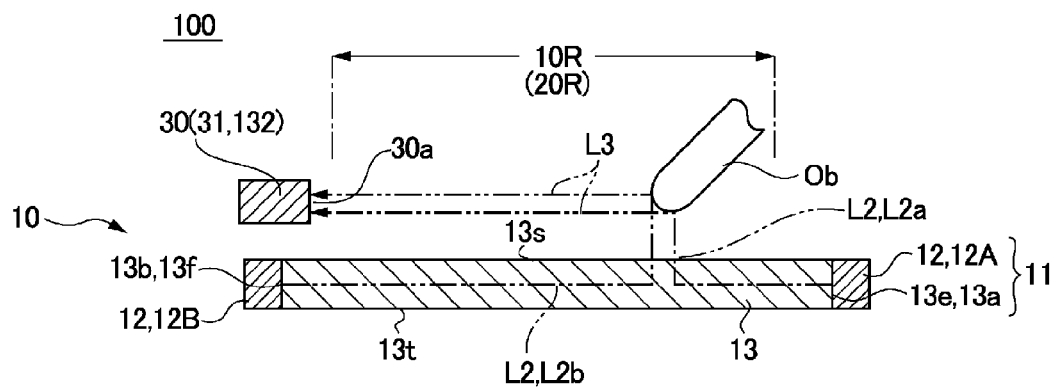
FIGS. 2A to 2C are explanatory diagrams showing a basic configuration of the optical position detecting apparatus according to the first embodiment of the invention.
Figure 2B:
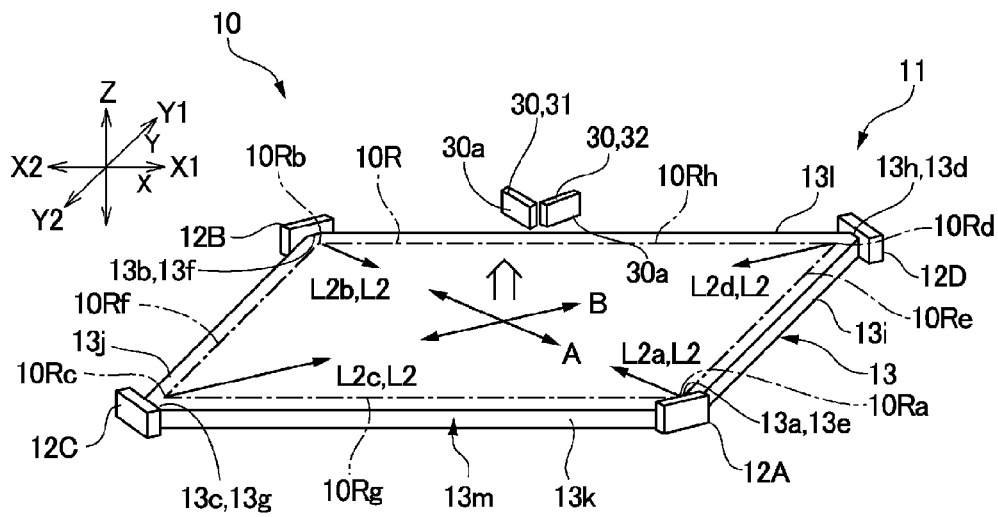
Figure 2C:
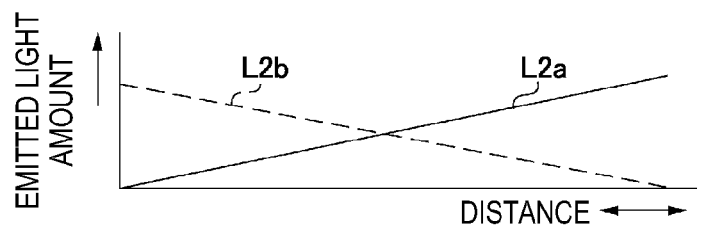

FIGS. 2A to 2C are explanatory diagrams showing a basic configuration of the optical position detecting apparatus 10 according to the first embodiment of the invention. FIG. 2A is an explanatory diagram schematically showing a sectional configuration of the optical position detecting apparatus 10. FIG. 2B is an explanatory diagram showing the configuration of the light guide plate 13 and the like used in the optical position detecting apparatus 10. FIG. 2C is an explanatory diagram showing an attenuation state of infrared light for position detection in the light guide plate 13. In FIG. 2B, the Z axis direction is represented as an up to down direction.

As shown in FIGS. 2A and 2B, in the optical position detecting apparatus 10 according to this embodiment, the light source device for position detection 11 includes the light guide plate 13 having a substantially rectangular plane shape. On a side end face 13m of the light guide plate 13, side portions 13k and 13l equivalent to long sides are opposed to each other in the Y axis direction and side portions 13i and 13j equivalent to short sides are opposed to each other in the X axis direction. To correspond to such shape of the light guide plate 13, the optical position detecting apparatus 10 includes four light sources for position detection 12A to 12D (the light sources for position detection 12 shown in FIGS. 1A and 1B) that emit position detection lights L2a to L2d. The light guide plate 13 includes, on the side end face 13m, four light incident sections 13a to 13d on which the position detection lights L2a to L2d are made incident. The light guide plate 13 includes, on one surface (an upper surface shown in the figure), the light emission surface 13s that emits the position detection lights L2a to L2d that have been propagated through the inside of the light guide plate 13. Such a light emission surface 13s and the side end face 13m are orthogonal to each other. The optical position detecting apparatus 10 includes the photodetector 30 including the light receiving unit 30a faced to the detection region 10R. In this embodiment, as explained later, plural photodetectors 30 (a first photodetector 31 and a second photodetector 32) are used.

In this embodiment, both of the four light sources for position detection 12A to 12D and the four light incident sections 13a to 13d are respectively provided at corner portions 13e, 13f, 13g, and 13h of the light guide plate 13. The light sources for position detection 12A to 12D are arranged to be opposed to the light incident sections 13a to 13d. The light sources for position detection 12A to 12D may be arranged to be closely attached to the light incident sections 13a to 13d.

The light guide plate 13 includes a transparent resin plate made of polycarbonate, acrylic resin, or the like. In the light guide plate 13, for example, a surface roughness structure, a prism structure, or a scattering layer (not shown) is provided on the light emission surface 13s or a rear surface 13t on the opposite side of the light emission surface 13s. Light made incident from the light incident sections 13a to 13d and propagated through the inside is gradually deflected by such a light scattering structure as the light further travels in a propagation direction thereof and emitted from the light emission surface 13s. In some case, an optical sheet such as a prism sheet or a light scattering plate is arranged on a light emission side of the light guide plate 13 according to necessity in order to realize uniformalization of the position detection lights L2a to L2d.

The light sources for position detection 12 (the light sources for position detection 12A to 12D) include light emitting elements such as LEDs (light emitting diodes). The light sources for position detection 12 (the light sources for position detection 12A to 12D) emit, as diverging light, the position detection lights L2 (the position detection lights L2a to L2d) including infrared lights according to a driving signal output from a driving circuit (not shown). A type of the position detection lights L2 is not specifically limited. The position detection lights 12 only have to have a wavelength distribution different from that of visible light or only have to be subjected to modulation such as blinking to have a light emission form different from that of the visible light. The position detection lights L2 may have a wavelength region efficiently reflected by the target object Ob such as a finger or a touch pen. Therefore, if the target object Ob is a human body such as a finger, the position detection lights L2 may be an infrared ray having high reflectance on the surface of the human body (in particular, a near infrared ray close to a visible light region, for example, near 850 nm in wavelength) or light having wavelength of 950 nm.

The detection region 10R is a region in which the position detection lights L2 are emitted to a visual recognition side (an operation side) and is a region in which reflected light by the target object Ob could be generated. In this embodiment, a plane shape of the detection region 10R is rectangular. The detection region 10R includes four corner portions 10Ra, 10Rb, 10Rc, and 10Rd and four side portions 10Re, 10Rf, 10Rg, and 10Rh. In this embodiment, the photodetector 30 is arranged in the substantially center section in the length direction of the side portion 10Rh. In the detection region 10R, an interior angle of a corner portion of sides adjacent to each other is 90 degrees. Such an interior angle is set the same as an interior angle of the corner portions 13e to 13h of the light guide plate 13.

In the display device with position detecting function 100 configured as explained above, on the inside of the light guide plate 13, the position detection light L2a emitted from the light source for position detection 12A and the position detection light L2b emitted from the light source for position detection 12B are emitted from the light emission surface 13s while being propagated in directions opposite to each other in a direction indicated by an arrow A. The position detection light L2c emitted from the light source for position detection 12C and the position detection light L2d emitted from the light source for position detection 12D are emitted from the light emission surface 13s while being propagated in directions opposite to each other in a direction (a direction indicated by an arrow B) crossing the direction indicated by the arrow A.

A light amount of the position detection light L2a emitted from the light guide plate 13 to the detection region 10R has an intensity distribution linearly attenuating according to a distance from the light source for position detection 12A as indicated by a solid line in FIG. 2C. A light amount of the position detection light L2b emitted to the detection region 10R has an intensity distribution linearly attenuating according to a distance from the light source for position detection 12B as indicated by a dotted line in FIG. 2C.

Detailed Configuration of the Optical Position Detecting Apparatus 10

Figure 3A:
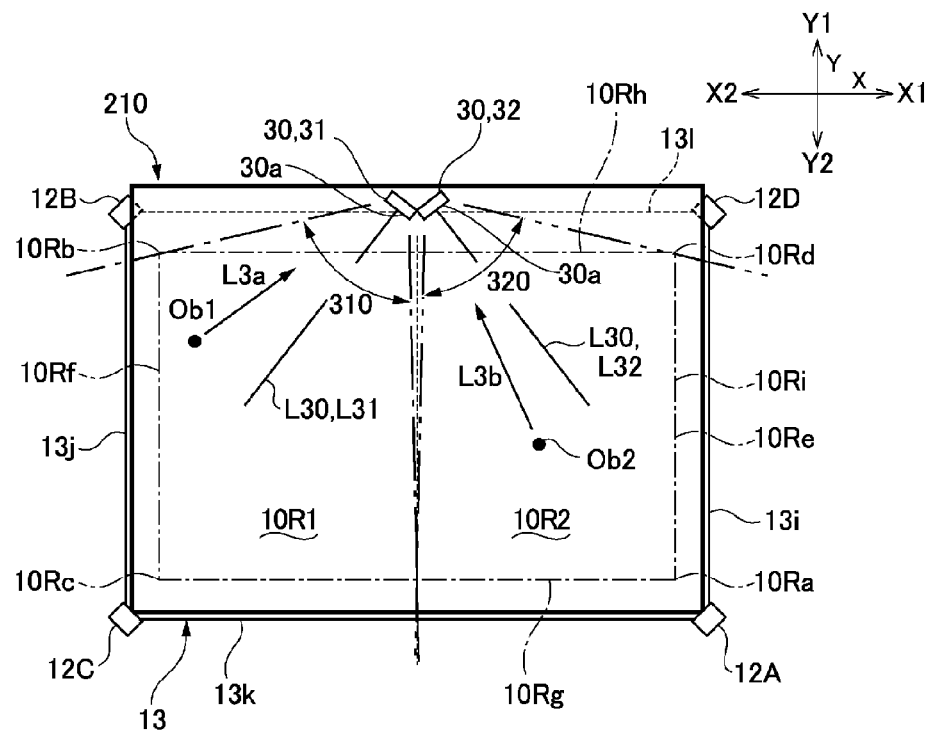
FIGS. 3A and 3B are explanatory diagrams showing a detailed configuration of the optical position detecting apparatus according to the first embodiment of the invention.
Figure 3B:
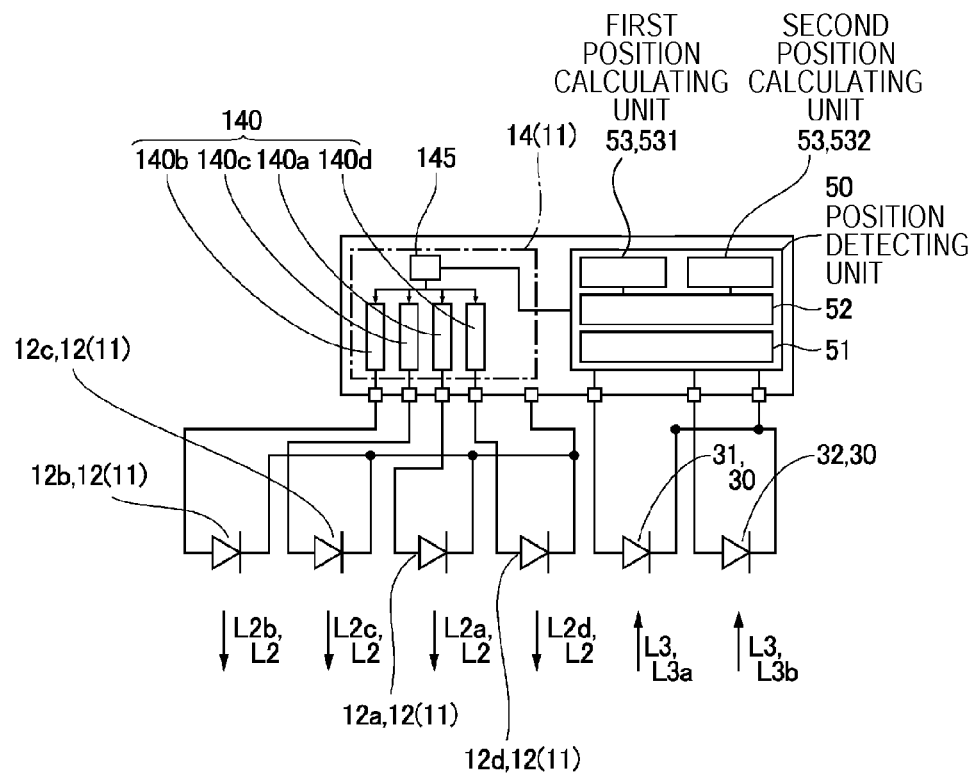

FIGS. 3A and 3B are explanatory diagrams showing a detailed configuration of the optical position detecting apparatus 10 according to the first embodiment of the invention. FIG. 3A is an explanatory diagram schematically showing incident angle ranges of the photodetectors 30 used in the optical position detecting apparatus 10 according to the first embodiment of the invention. FIG. 3B is an explanatory diagram showing an electric configuration and the like of the optical position detecting apparatus 10.

As shown in FIGS. 1A and 1B, FIGS. 2A and 2B, and FIG. 3A, in the optical position detecting apparatus 10 according to this embodiment, the first photodetector 31 and the second photodetector 32 are used as the photodetectors 30. The light source device for position detection 11 includes the four light sources for position detection 12 (the light sources for position detection 12A to 12D). Therefore, as shown in FIG. 13B, in the optical position detecting apparatus 10, the light source device for position detection 11 includes a light-source driving unit 14 that drives the four light sources for position detection 12. The light-source driving unit 14 includes a light-source driving circuit 140 that drives the light sources for position detection 12 and a light-source control unit 145 that controls lighting patterns of the respective plural light sources for position detection 12 via the light-source driving circuit 140. The light-source driving circuit 140 includes a first light-source driving circuit 140a that drives the light source for position detection 12A, a second light-source driving circuit 140b that drives the light source for position detection 12B, a third light-source driving circuit 140c that drives the light source for position detection 12C, and a fourth light-source driving circuit 140d that drives the light source for position detection 12D. The light-source control unit 145 controls all of the first light-source driving circuit 140a, the second light-source driving circuit 140b, the third light-source driving circuit 140c, and the fourth light-source driving circuit 140d.

The optical position detecting apparatus 10 includes a position detecting device 50 that detects the position of the target object Ob on the basis of detection results in the photodetectors 30. The position detecting device 50 and the light-source driving unit 14 are included in a common semiconductor integrated circuit 500. The light-source control unit 145 and the position detecting device 50 are connected by a signal line. Driving for the light sources for position detection 12 and detection operation in the position detecting device 50 are performed in association with each other.

In this embodiment, the two photodetectors 30 are used as the first photodetector 31 and the second photodetector 32. In this embodiment, cathodes of the two photodetectors 30 are connected to the position detecting device 50 by a common line. Anodes of the two photodetectors 30 are separately connected to the position detecting device 50. Therefore, detection results in the two photodetectors 30 are output to the position detecting device 50 independently from each other.

The position detecting device 50 has a function of detecting XYZ coordinates of the target object Ob on the basis of the detection results in the photodetectors 30. The position detecting device 50 detects XYZ coordinates of the target object Ob corresponding to the respective detection results in the two photodetectors 30. Therefore, the position detecting device 50 includes two position calculating units 53 (a first position calculating unit 531 and a second position calculating unit 532) that detect XYZ coordinates of the target object Ob on the basis of the respective detection results in the two photodetectors 30. The first position calculating unit 531 detects XYZ coordinates of the target object Ob on the basis of a detection result in the first photodetector 31. The second position calculating unit 532 detects XYZ coordinates of the target object Ob on the basis of a detection result in the second photodetector 32. However, in this embodiment, a signal processing unit 52 for the detection results in the two photodetectors 30 is common. Therefore, an input control unit 51 that controls signal inputs from the two photodetectors 30 to the signal processing unit 52 is provided at a pre-stage of the signal processing unit 52. The detection results in the two photodetectors 30 are sequentially input to the signal processing unit 52. However, when the signal processing unit 52 is provided for each of the two photodetectors 30, the input control unit 51 can be omitted.

Detailed Configuration of the Photodetectors 30

Figure 4:
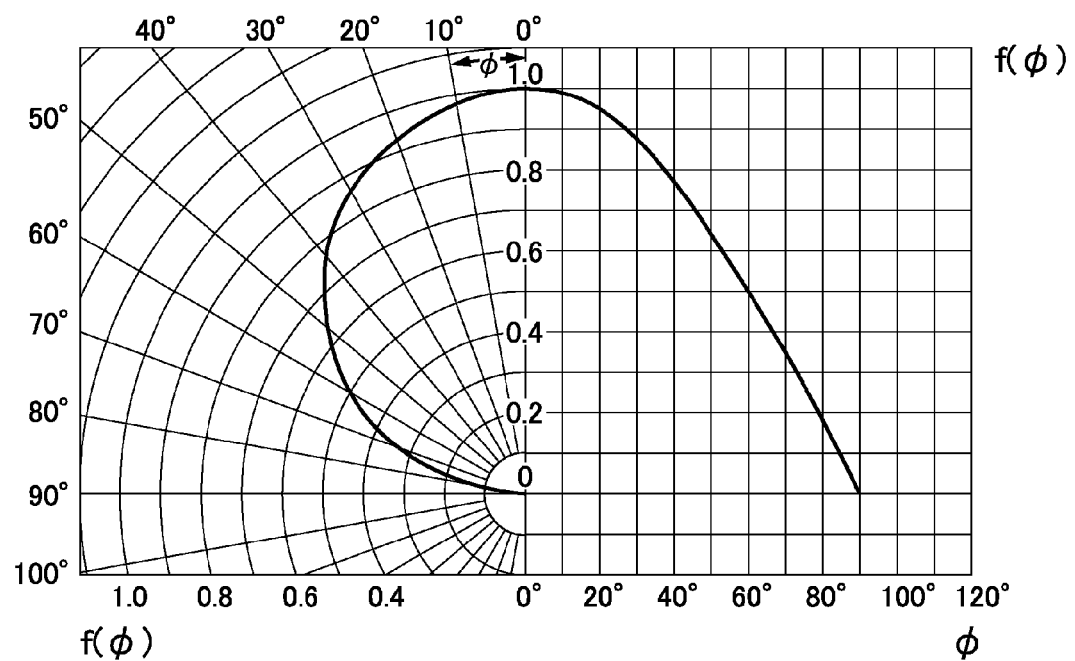
FIG. 4 is an explanatory diagram showing sensitivity directivity of photodiodes used in photodetectors of the optical position detecting apparatus according to the first embodiment of the invention.
Figure 5A:
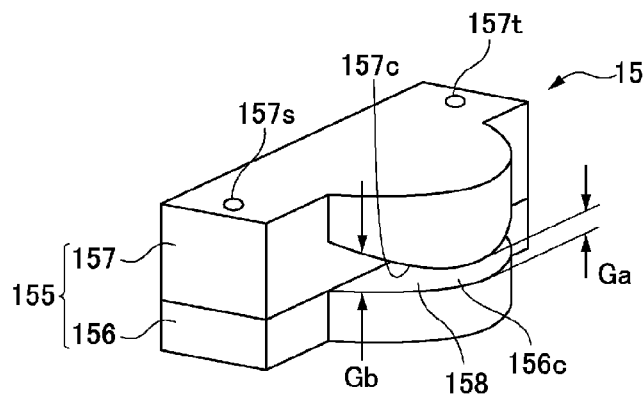
FIGS. 5A to 5D are explanatory diagrams of an incident-angle-range limiting member used in the optical position detecting apparatus according to the first embodiment of the invention.
Figures 5B, 5C:
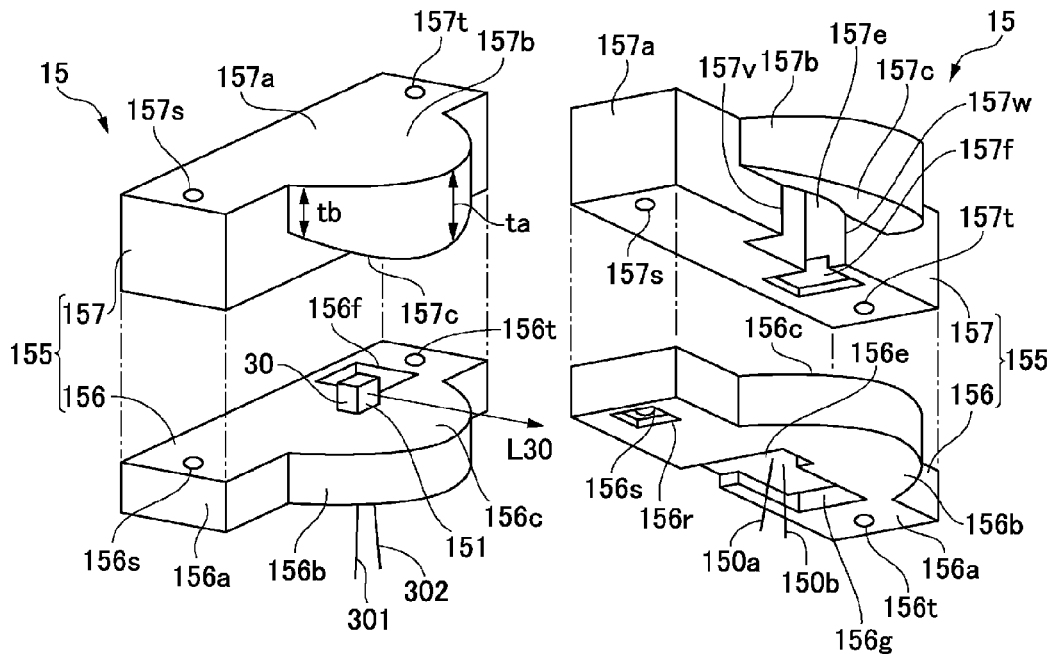
Figure 5D:
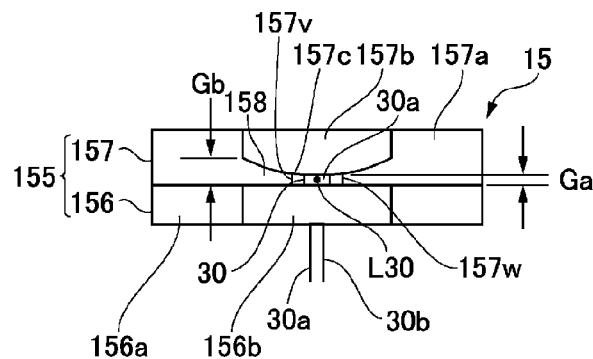

FIG. 4 is an explanatory diagram showing sensitivity directivity of photodiodes used in the photodetectors 30 of the optical position detecting apparatus 10 according to the first embodiment of the invention. FIGS. 5A to 5D are explanatory diagrams of an incident-angle-range limiting member used in the optical position detecting apparatus 10 according to the first embodiment of the invention. FIG. 5A is a perspective view of the incident-angle-range limiting member viewed from obliquely above. FIG. 5B is a disassembled perspective view of the incident-angle-range limiting member viewed from obliquely above. FIG. 5C is a disassembled perspective view of the incident-angle-range limiting member viewed from obliquely below. FIG. 5D is a front view of the incident-angle-range limiting member.

In this embodiment, as shown in FIG. 3A, the two photodetectors 30 (the first photodetector 31 and the second photodetector 32) direct incident angle ranges to different regions 10R1 and 10R2 in the detection region 10R. In this embodiment, the detection region 10R is equally divided into the two regions 10R1 and 10R2 in the X axis direction. The incident angle ranges of the first photodetector 31 and the second photodetector 32 are directed to such two regions 10R1 and 10R2. Specifically, an incident angle range 310 of the first photodetector 31 is a range between thick alternate long and short dash lines shown in FIG. 3A and is directed to the region 10R1. An incident angle range 320 of the second photodetector 32 is a range between thick alternate long and two short dashes lines shown in FIG. 3A and is directed to the region 10R2. Therefore, the first photodetector 31 detects position detection light L3a reflected on a target object Ob1 located in the incident angle range 310 (in the region 10R1). The second photodetector 32 detects position detection light L3b reflected on a target object Ob2 located in the incident angle range 320 (in the region 10R2).

The two regions 10R1 and 10R2 do not overlap each other. In the detection region 10R, the incident angle ranges 310 and 320 do not overlap each other. Ends of the regions 10R1 and 10R2 adjacent to each other are in contact with each other. The incident angle ranges 310 and 320 adjacent to each other are close to or in contact with each other.

When such incident angle ranges 310 and 320 are set, in this embodiment, the two photodetectors 30 (the first photodetector 31 and the second photodetector 32) are arranged to be adjacent to each other in a specific place adjacent to one side portion of the detection region 10R. Center optical axes L30 (center optical axes L31 and L32) of the photodetectors 30 are directed to directions different from each other.

The photodiodes used in the photodetectors 30 have sensitivity directivity shown in FIG. 4. In FIG. 4, a relation between an angle $\Phi$ with respect to the center optical axes L30 of the photodetectors 30 and sensitivity $f(\Phi)$ is shown. The sensitivity $f(\Phi)$ on the side (the front) of the center optical axes L30 of the photodetectors 30 is shown as 1.0. As shown in FIG. 4, the sensitivity $f(\Phi)$ of the photodetectors 30 is a maximum on the side (the front) of the center optical axes L30 and falls as the angle $\Phi$ with respect to the center optical axes L30 of the photodetectors 30 increases. However, the photodetectors 30 detect light in relatively wide angle ranges. Ranges in which the angle $\Phi$ with respect to the center optical axes L30 of the photodetector 30 is small are high-sensitivity angle ranges in which the sensitivity $f(\Phi)$ is high. However, when the angle $\Phi$ with respect to the center optical axes L30 of the photodetectors 30 increases, the sensitivity $f(\Phi)$ falls. A detection error is large in such low-sensitivity angle ranges.

Therefore, in this embodiment, for example, an incident-angle-range limiting member 15 (an incident-angle-range limiting unit) shown in FIGS. 5A to 5D is provided for each of the two photodetectors 30 to specify the incident angle ranges 310 and 320 of the photodetector 30. In this embodiment, a difference between an incident light amount on the center optical axes L30 side of the photodetectors 30 and an incident light amount in angle directions away from the center optical axes L30 is reduced by the incident-angle-range limiting member 15 shown in FIGS. 5A to 5D.

An incident-angle-range limiting member 155 shown in FIGS. 5A to 5D includes a first light blocking member 156 made of a black resin molded product arranged on one side in the Z axis direction with respect to the photodetector 30 and a second light blocking member 157 made of a black resin molded product arranged on the other side in the Z axis direction with respect to the photodetector 30. The photodetector 30 is held between the first light blocking member 156 and the second light blocking member 157. In the incident-angle-range limiting member 155, a slit 158 extending from the center optical axis L30 side of the photodetector 30 to both sides in a peripheral direction is formed as a light incident opening by the first light blocking member 156 and the second light blocking member 157. Slit width of such a slit 158 increases in an angle direction further away from the center optical axis L30 than the center optical axis L30 side of the photodetector 30.

When such an incident-angle-range limiting member 155 is configured, the first light blocking member 156 includes a substantially rectangular parallelepiped base section 156a (a first light blocking member side base section) that holds two lead wires 301 and 302 of the photodetector 30 and a projecting section for light blocking 156b (a first light blocking section) of a semicircular plate shape projecting forward from the front surface of the base section 156a. The second light blocking member 157 includes a substantially rectangular parallelepiped base section 157a (a first light blocking member side base section) and a projecting section for light blocking 157b (a second light blocking section) of a semicircular plate shape projecting forward from the front surface of the base section 157a. The projecting sections for light blocking 156b and 157b have a semicircular shape having the center on a side on which the photodetector 30 is located.

The photodetector 30 according to this embodiment is held to project on the side of a surface overlapping the second light blocking member 157 in the base section 156a of the first light blocking member 156. A recessed section 157e is formed in a section overlapping the photodetector 30 in the second light blocking member 157. A front of such a recessed section 157e is opened. Therefore, the first light blocking member 156 and the second light blocking member 157 can be laid one on top of the other such that the base sections 156a and 157a overlap. In a state in which the first light blocking member 156 and the second light blocking member 157 are laid one on top of the other, the light receiving unit 30a of the photodetector 30 is opened to the outside via the recessed section 157e.

Left and right wall surfaces 157v and 157w of the recessed section 157e function as a third light blocking section that shields an oblique front of the light receiving unit 30a of the photodetector 30 from light. Therefore, a range in which light can be made incident on the photodetector 30 can be limited to the incident angle ranges 310 and 320 explained with reference to FIG. 3A.

Holes 156s and 157s communicating with each other are formed at one ends of the base sections 156a and 157a. Holes 156t and 157t communicating with each other are formed at the other ends of the base sections 156a and 157a. Therefore, the first light blocking member 156 and the second light blocking member 157 can be coupled in the base sections 156a and 157a by screwing the holes 156s and 157s and screwing the holes 156t and 157t. The base sections 156a and 157a may be bonded and fixed to couple the first light blocking member 156 and the second light blocking member 157. A forming region of the hole 156s is a recessed section 156r in the base section 156a.

In the incident-angle-range limiting member 155 configured as explained above, when the first light blocking member 156 and the second light blocking member 157 are coupled, the slit 158 is formed between the projecting section for light blocking 156b and the projecting section for light blocking 157b over an angle range of about 180°. The light receiving unit 30a of the photodetector 30 is located in an inner part of such a slit 158. Since the projecting section for light blocking 156b of the first light blocking member 156 has fixed thickness, an inner surface 156c on a side on which the slit 158 is located in the projecting section for light blocking 156b is a surface parallel to the center optical axis L30 of the optical detector 30. On the other hand, in the projecting section for light blocking 157b of the second light blocking member 157, an outer surface on the opposite side of the side on which the slit 158 is located is a surface parallel to the center optical axis L30 of the photodetector 30. However, an inner surface 157c on the side on which the slit 158 is located is a taper surface. Therefore, thickness to on the center optical axis L30 side of the projecting section for light blocking 157b is larger than thickness tb in an angle direction away from the center optical axis L30. Therefore, a width dimension of the slit 158 increases as an angle with respect to the center optical axis L30 increases. A width dimension Ga on the center optical axis L30 side of the slit 158 is smaller than a width dimension Gb in the angle direction away from the center optical axis L30. The width dimension of the slit 158 continuously expands from the side on which the center optical axis L30 is located to both the ends in the peripheral direction to offset a change in the sensitivity f (Φ) in the photodetector 30. For example, a width dimension in each angle position of the slit 158 is an inverse number of the sensitivity f (Φ). The width dimension of the slit 158 may expand stepwise from the side on which the center optical axis L30 is located to both the ends in the peripheral direction.

If the incident-angle-range limiting member 155 configured as explained above is used, the oblique front of the light receiving unit 30a of the photodetector 30 is blocked by the left and right wall surfaces 157v and 157w of the recessed section 157e. Therefore, the range in which light can be made incident on the photodetector 30 can be set to the incident angle ranges 310 and 320 explained with reference to FIG. 3A. In the photodetector 30 alone, the sensitivity f (Φ) is substantially different between the side of the center optical axis L30 and the direction away from the center optical axis L30. However, in the incident-angle-range limiting member 155, the light incident opening on the center optical axis L30 side of the photodetector 30 is narrower than the light incident opening in the angle direction away from the center optical axis L30. Therefore, the sensitivity f (Φ) can be set equal on the side of the center optical axis L30 and in the direction away from the center optical axis L30.

A recessed section 156e is formed on the bottom of the first light blocking member 156 in this embodiment. A groove-like through hole 156g piercing through the base section 156a is formed at an end of such a recessed section 156e. A section where the groove-like through hole 156g is opened is a recessed section 156f on the surface overlapping the second light blocking member 157 in the base section 156a. A recessed section 157f is formed in a section overlapping the recessed section 156f in the second light blocking member 157. Further, the recessed section 157f is connected to the recessed section 157e in which the photodetector 30 is housed. Therefore, in the incident-angle-range limiting member 155 shown in FIGS. 5A to 5D, when the photodetector 30 is used while being surface-mounted on a flexible wiring board (not shown), the flexible wiring board can be drawn out to an outer side through the recessed sections 156f and 157f and the groove-like through hole 156g.

Basic Principle of Coordinate Detection

Figure 6A:
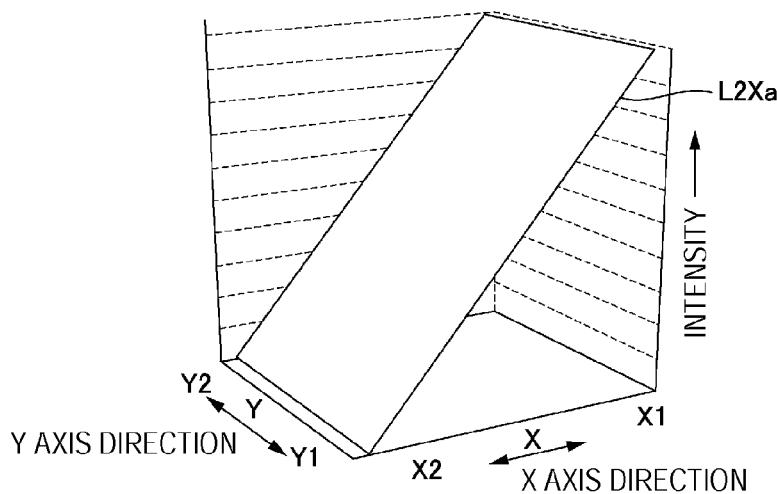
FIGS. 6A to 6C are explanatory diagrams for explaining a basic principle of a coordinate detecting method used in the optical position detecting apparatus according to the first embodiment of the invention.
Figure 6B:
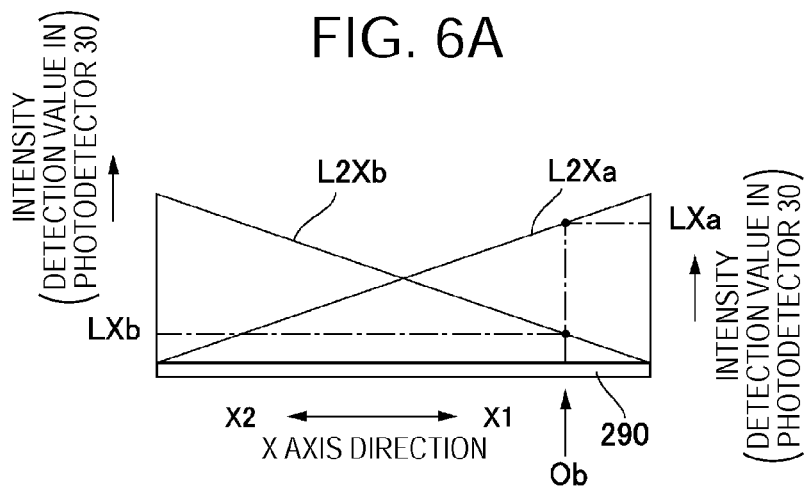
Figure 6C:
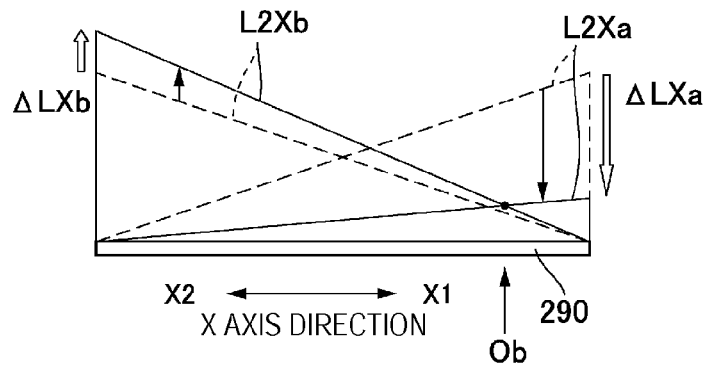

A basic principle of a coordinate detecting method adopted in the optical position detecting apparatus 10 according to this embodiment is explained with reference to FIGS. 6A to 6C. FIGS. 6A to 6C are explanatory diagrams showing the basic principle of the coordinate detecting method adopted in the optical position detecting apparatus 10 according to this embodiment. FIG. 6A is an explanatory diagram showing an intensity distribution in the X axis direction of the position detection light L2. FIG. 6B is an explanatory diagram showing the intensity of the position detection light L3 reflected on the target object Ob. FIG. 6C is an explanatory diagram showing a state in which an intensity distribution of the position detection light L2 is adjusted such that the intensity of the position detection light L3 reflected on the target object Ob is equal.

In the optical position detecting apparatus 10 according to this embodiment, the position detecting device 50 detects the position of the target object Ob in the detection region 10R making use of the intensity distribution of the position detection lights L2 shown in FIG. 2B. Specifically, in the optical position detecting apparatus 10 according to this embodiment, when the light source device for position detection 11 emits the position detection lights L2, an intensity distribution of the position detection lights L2 is formed in the detection region 10R according to a distance from the light sources for position detection 12 and the positions of center optical axes of the light sources for position detection 12. Therefore, when an X coordinate is detected, as shown in FIGS. 6A and 6B, first, in a first period for X coordinate detection, a first intensity distribution for X coordinate detection L2Xa (an intensity distribution for first coordinate detection/a first intensity distribution for first coordinate detection) in which intensity monotonously decreases from one side X1 to the other side X2 of the X axis direction is formed. Thereafter, in a second period for X coordinate detection, a second intensity distribution for X coordinate detection L2Xb (an intensity distribution for first coordinate detection/a second intensity distribution for first coordinate detection) in which intensity monotonously decreases from the other side X2 to one side X1 of the X axis direction is formed. In the first period for X coordinate detection, the first intensity distribution for X coordinate detection L2Xa in which intensity linearly decreases from one side X1 to the other side X2 of the X axis direction may be formed. Thereafter, in the second period for X coordinate detection, the second intensity distribution for X coordinate detection L2Xb in which intensity linearly decreases from the other side X2 to one side X1 of the X axis direction may be formed. The intensity in the Y axis direction is fixed in the first intensity distribution for X coordinate detection L2Xa and the second intensity distribution for X coordinate detection L2Xb. Therefore, when the target object Ob is arranged in the detection region 10R, the position detection lights L2 are reflected by the target object Ob and a part of reflected lights of the position detection lights L2 is detected by the photodetectors 30. If the first intensity distribution for X coordinate detection L2Xa formed in the first period for X coordinate detection and the second intensity distribution for X coordinate detection L2Xb formed in the second period for X coordinate detection are distributions set in advance, the position calculating unit of the position detecting device 50 can detect an X coordinate of the target object Ob on the basis of detection results in the photodetectors 30 according to, for example, a method explained below.

For example, in a first method, a difference between the first intensity distribution for X coordinate detection L2Xa and the second intensity distribution for X coordinate detection L2Xb shown in FIG. 6B is utilized. More specifically, since the first intensity distribution for X coordinate detection L2Xa and the second intensity distribution for X coordinate detection L2Xb are the distributions set in advance, the difference between the first intensity distribution for X coordinate detection L2Xa and the second intensity distribution for X coordinate detection L2Xb is a function set in advance. Therefore, if a difference between a detection value Lxa in the photodetectors 30 obtained when the first intensity distribution for X coordinate detection L2Xa is formed in the first period for X coordinate detection and a detection value Lxb in the photodetectors 30 obtained when the second intensity distribution for X coordinate detection L2Xb is formed in the second period for X coordinate detection is calculated, the position calculating unit 53 of the position detecting device 50 can detect an X coordinate of the target object Ob. With such a method, even when an infrared component included in environment light other than the position detection lights L2, for example, external light is made incident on the photodetectors 30, the intensity of the infrared component included in the environment light is offset when the difference between the detection values LXa and LXb is calculated. Therefore, the infrared component included in the environment light does not affect detection accuracy. It is also possible to detect an X coordinate of the target object Ob according to a ratio between the detection value LXa and the detection value LXb.

A second method is a method of detecting an X coordinate of the target object Ob on the basis of an adjustment amount in adjustment of a control amount (driving current) for the light sources for position detection 12 such that the detection value Lxa in the photodetectors 30 obtained when the first intensity distribution for X coordinate detection L2Xa is formed in the first period for X coordinate detection and the detection value Lxb in the photodetectors 30 obtained when the second intensity distribution for X coordinate detection L2Xb is formed in the second period for X coordinate detection are equal. Such a method can be applied when the first intensity distribution for X coordinate detection L2Xa and the second intensity distribution for X coordinate detection L2Xb shown in FIG. 6B linearly change with respect to an X coordinate.

First, as shown in FIG. 6B, in the first period for X coordinate detection and the second period for X coordinate detection, the first intensity distribution for X coordinate detection L2Xa and the second intensity distribution for X coordinate detection L2Xb are formed such that absolute values thereof are equal and are in opposite directions in the X axis direction. If the detection value LXa in the photodetectors 30 in the first period for X coordinate detection and the detection value LXb in the photodetectors 30 in the second period for X coordinate detection are equal in this state, it is seen that the target object Ob is located in the center in the X axis direction.

On the other hand, when the detection value LXa in the photodetectors 30 in the first period for X coordinate detection and the detection value LXb in the photodetectors 30 in the second period for X coordinate detection are different, a control amount (driving current) for the light sources for position detection 12 is adjusted such that the detection values LXa and LXb are equal. As shown in FIG. 6C, the first intensity distribution for X coordinate detection L2Xa is formed in the first period for X coordinate detection again and the second intensity distribution for X coordinate detection L2Xb is formed in the second period for X coordinate detection again. As a result, if the detection value LXa in the photodetectors 30 in the first period for X coordinate detection and the detection value LXb in the photodetectors 30 in the second period for X coordinate detection are equal, the position calculating unit 53 of the position detecting device 50 can detect an X coordinate of the target object Ob according to a ratio, a difference, or the like between an adjustment amount ΔLXa of a control amount for the light sources for position detection 12 in the first period for X coordinate detection and an adjustment amount ΔLXb of a control amount for the light sources for position detection 12 in the second period for X coordinate detection. With such a method, even when an infrared component included in environment light other than the position detection lights L2, for example, external light is made incident on the photodetectors 30, the intensity of the infrared component included in the environment light is offset when the adjustment of the control amount for the light sources for position detection 12 is performed such that the detection values LXa and LXb are equal. Therefore, the infrared component included in the environment light does not affect detection accuracy.

A third method is, like the second method, a method of detecting an X coordinate of the target object Ob on the basis of an adjustment amount in adjustment of a control amount (driving current) for the light sources for position detection 12 such that the detection value Lxa in the photodetectors 30 obtained when the first intensity distribution for X coordinate detection L2Xa is formed in the first period for X coordinate detection and the detection value Lxb in the photodetectors 30 obtained when the second intensity distribution for X coordinate detection L2Xb is formed in the second period for X coordinate detection are equal. Such a method can be applied when the first intensity distribution for X coordinate detection L2Xa and the second intensity distribution for X coordinate detection L2Xb shown in FIG. 6B linearly change with respect to an X coordinate.

First, as shown in FIG. 6B, in the first period for X coordinate detection and the second period for X coordinate detection, the first intensity distribution for X coordinate detection L2Xa and the second intensity distribution for X coordinate detection L2Xb are formed such that absolute values thereof are equal and are in opposite directions in the X axis direction. If the detection value LXa in the photodetectors 30 in the first period for X coordinate detection and the detection value LXb in the photodetectors 30 in the second period for X coordinate detection are equal in this state, it is seen that the target object Ob is located in the center in the X axis direction.

On the other hand, when the detection value LXa in the photodetectors 30 in the first period for X coordinate detection and the detection value LXb in the photodetectors 30 in the second period for X coordinate detection are different, for example, a control amount (driving current) for the light sources for position detection 12 in the period with a lower detection value or the period with a higher detection value is adjusted such that the detection values LXa and LXb are equal. The first intensity distribution for X coordinate detection L2Xa is formed in the first period for X coordinate detection again and the second intensity distribution for X coordinate detection L2Xb is formed in the second period for X coordinate detection again. In an example shown in FIG. 6C, for example, a control amount for the light sources for position adjustment 12 in the first period for X coordinate detection is reduced by the adjustment amount ΔLXa. Alternatively, a control amount for the light sources for position detection 12 in the second period for X coordinate detection is increased by the adjustment amount ΔLXb. As a result, if the detection value LXa in the photodetectors 30 in the first period for X coordinate detection and the detection value LXb in the photodetectors 30 in the second period for X coordinate detection are equal, the position calculating unit 53 of the position detecting device 50 can detect an X coordinate of the target object Ob according to a ratio, a difference, or the like between the control amount for the light sources for position detection 12 in the first period for X coordinate detection after the adjustment and the control amount for the light sources for position detection 12 in the second period for X coordinate detection after the adjustment. With such a method, even when an infrared component included in environment light other than the position detection light L2, for example, external light is made incident on the photodetectors 30, the intensity of the infrared component included in the environment light is offset when the adjustment of the control amount for the light sources for position detection 12 is performed such that the detection values LXa and LXb are equal. Therefore, the infrared component included in the environment light does not affect detection accuracy.

Whichever of the first to third methods is adopted, similarly, if, after a first intensity distribution for Y coordinate detection (an intensity distribution for second coordinate detection/a first intensity distribution for second coordinate detection) in which intensity monotonously decreases from one side Y1 to the other side Y2 of the Y axis direction is formed in the first period for Y coordinate detection, a second intensity distribution for Y coordinate detection (an intensity distribution for second coordinate detection/a second intensity distribution for second coordinate detection) in which intensity monotonously decreases from the other side Y2 to one side Y1 of the Y axis direction is formed, the position calculating unit 53 of the position detecting device 50 can detect a Y coordinate of the target object Ob.

If an intensity distribution in the Z axis direction (an intensity distribution for third coordinate detection) is formed in a Z coordinate detection period, the position calculating unit 53 of the position detecting device 50 can detect a Z coordinate of the target object Ob.

In acquiring position information in the detection region 10R of the target object Ob on the basis of detection results in the photodetectors 30 as explained above, for example, it is possible to adopt a configuration for using a microprocessor unit (MPU) as the position detecting device 50 and performing processing according to execution of predetermined software (an operation program) by the microprocessor unit. It is also possible to adopt a configuration for performing processing in a signal processing unit including hardware such as a logic circuit.

Coordinate Detecting Operation

Operation for detecting the position of the target object Ob in the detection region 10R in the optical position detecting apparatus 10 according to this embodiment is explained. In the optical position detecting apparatus 10 according to this embodiment, to detect XY coordinates of the target object Ob in the detection region 10R, an X coordinate is detected in the first period for X coordinate detection and the second period for X coordinate detection and a Y coordinate is detected in a first period for Y coordinate detection and a second period for Y coordinate detection as explained below. Further, in the display device for position detecting function 100 according to this embodiment, a Z coordinate is detected in the Z coordinate detection period. Time of each of the first period for X coordinate detection, the second period for Y coordinate detection, and the Z coordinate detection period is, for example, about several milliseconds.

In the optical position detecting apparatus 10 according to this embodiment, the two photodetectors 30 and the two position calculating unit 53 are provided. Therefore, after operations explained below is performed in one photodetector 30 and one position calculating unit 53, the operations explained below are also sequentially performed in the other photodetector 30 and the other position calculating unit 53.

X Coordinate Detecting Operation

In the optical position detecting apparatus 10 according to this embodiment, to detect an X coordinate of the target object Ob in the detection region 10R, first, in the first period for X coordinate detection, the light sources for position detection 12A and 12D shown in FIG. 2B are turned on and the light sources for position detection 12B and 12C are turned off. As a result, a first intensity distribution for X coordinate detection L2Xa in which the intensity of position detection light monotonously decreases from one side X1 to the other side X2 of the X axis direction is formed. In the first intensity distribution for X coordinate detection in this embodiment, the intensity of the position detection light continuously decreases linearly from one side X1 to the other side X2 of the X axis direction. In such a first intensity distribution for X coordinate detection, a position in the X axis direction and the intensity of the position detection light have a fixed relation. Therefore, an amount of light reflected on the target object Ob and detected by the photodetector 30 is a value that is proportional to the intensity of the position detection light in the first intensity distribution for X coordinate detection and specified by the position of the target object Ob.

Subsequently, in the second period for X coordinate detection, the light sources for position detection 12A and 12D shown in FIG. 2B are turned off and the light sources for position detection 12B and 12C shown in FIG. 2B are turned on. As a result, a second intensity distribution for X coordinate detection in which the intensity of the position detection light monotonously decreases from the other side X2 to one side X1 of the X axis direction is formed. In the second intensity distribution for X coordinate detection in this embodiment, the intensity of the position detection light continuously decreases linearly from the other X2 to one side X1 of the X axis direction. In such a second intensity distribution for X coordinate detection, as in the first intensity distribution for X coordinate detection, a position in the X axis direction and the intensity of the position detection light have a fixed relation. Therefore, an amount of light reflected on the target object Ob and detected by the photodetector 30 is a value that is proportional to the intensity of the position detection light in the second intensity distribution for X coordinate detection and specified by a position in the X axis direction of the target object Ob.

Therefore, as explained with reference to FIGS. 6A to 6C, the position calculating unit 53 of the position detecting device 50 can detect an X coordinate of the target object Ob on the basis of a comparison result of the light amount detected by the photodetector 30 in the first period for X coordinate detection and the light amount detected by the photodetector 30 in the second period for X coordinate detection.

Y Coordinate Detecting Operation

In the optical position detecting apparatus 10 according to this embodiment, to detect a Y coordinate of the target object Ob in the detection region 10R, first, in the first period for Y coordinate detection, the light sources for position detection 12B and 12D shown in FIG. 2B are turned on and the light sources for position detection 12A and 12C shown in FIG. 2B are turned off. As a result, a first intensity distribution for Y coordinate detection in which the intensity of position detection light monotonously decreases from one side Y1 to the other side Y2 of the Y axis direction is formed. In the first intensity distribution for Y coordinate detection in this embodiment, the intensity of the position detection light continuously decreases linearly from one side Y1 to the other side Y2 of the Y axis direction. In such a first intensity distribution for Y coordinate detection, a position in the Y axis direction and the intensity of the position detection light have a fixed relation. Therefore, an amount of light reflected on the target object Ob and detected by the photodetector 30 is a value that is proportional to the intensity of the position detection light in the first intensity distribution for Y coordinate detection and specified by a position in the Y axis direction of the target object Ob.

Subsequently, in the second period for Y coordinate detection, the light sources for position detection 12B and 12D shown in FIG. 2B are turned off and the light sources for position detection 12A and 12C shown in FIG. 2B are turned on. As a result, a second intensity distribution for Y coordinate detection in which the intensity of the position detection light monotonously decreases from the other side Y2 to one side Y1 of the Y axis direction is formed. In the second intensity distribution for Y coordinate detection in this embodiment, the intensity of the position detection light continuously decreases linearly from the other Y2 to one side Y1 of the Y axis direction. In such a second intensity distribution for Y coordinate detection, as in the first intensity distribution for Y coordinate detection, a position in the Y axis direction and the intensity of the position detection light have a fixed relation. Therefore, an amount of light reflected on the target object Ob and detected by the photodetector 30 is a value that is proportional to the intensity of the position detection light in the second intensity distribution for Y coordinate detection and specified by a position in the Y axis direction of the target object Ob.

Therefore, as explained with reference to FIGS. 6A to 6C, the position calculating unit 53 of the position detecting device 50 can detect a Y coordinate of the target object Ob on the basis of a comparison result of the light amount detected by the photodetector 30 in the first period for Y coordinate detection and the light amount detected by the photodetector 30 in the second period for Y coordinate detection.

Z Coordinate Detecting Operation

In the optical position detecting apparatus 10 according to this embodiment, to detect a Z coordinate of the target object Ob in the detection region 10R, all the light sources for position detection 12A to 12D are turned on. As a result, an intensity distribution for Z coordinate detection in which the intensity of position detection light monotonously decreases in the Z axis direction is formed. In such an intensity distribution for Z coordinate detection, a position in the Z axis direction and the intensity of the position detection light have a fixed relation. Therefore, an amount of light reflected on the target object Ob and detected by the photodetector 30 is a value that is proportional to the intensity of the position detection light in the intensity distribution for Z coordinate detection and specified by a position in the Z axis direction of the target object Ob. Therefore, the position calculating unit 53 of the position detecting device 50 can detect a Z coordinate of the target object Ob on the basis of a detection result of the photodetector 30 in the Z coordinate detection period. Such detection of the Z coordinate can be utilized for setting a predetermined range in the Z axis direction as a detection valid region in the detection region 10R. For example, if a range within 5 cm from the surface of the screen member 290 is set as the detection valid region, when the target object Ob is detected in a position exceeding 5 cm from the surface of the screen member 290, a result of the detection can be regarded as invalid. Therefore, it is possible to perform processing for regarding, only when the target object Ob is detected in the range within 5 cm from the surface of the screen member 290, that XY coordinates of the target object Ob is input.

Multi-Point Detection

In the optical position detecting apparatus 10 according to this embodiment, after the operations explained above are performed in one photodetector 30 and one position calculating unit 53, the operations are performed in the same manner in the other photodetector 30 and the other position calculating unit 53. Specifically, the first position calculating unit 531 detects XYZ coordinates of the target object Ob on the basis of a detection result in the first photodetector 31. Subsequently, the second position calculating unit 532 detects XYZ coordinates of the target object Ob on the basis of a detection result in the second photodetector 32. As a result, according to the detection result in the first photodetector 31, presence or absence and a coordinate of the target object Ob in the region 10R1 shown in FIG. 3A can be detected. According to the detection result in the second photodetector 32, presence or absence and a coordinate of the target object Ob in the region 10R2 can be detected. Accordingly, presence or absence and a coordinate of the target object Ob can be detected for each of the two regions 10R1 and 10R2 of the detection region 10R.

Main Effects of this Embodiment

As explained above, in the optical position detecting apparatus 10 and the display device with position detecting function 100 according to this embodiment, the position detection lights L2 including infrared lights are emitted to the detection region 10R and the position detection lights L2 reflected by the target object Ob in the detection region 10R are detected by the photodetectors 30. Since the position detection lights L2 form an intensity distribution in the detection region 10R, if a relation between a position in the detection region 10R and the intensity of the position detection lights L2 is grasped in advance, the position detecting device 50 can detect XYZ coordinates of the target object Ob on the basis of light reception results of the photodetectors 30. Since the position detection lights L2 include infrared lights, the position detection lights L2 are not visually recognized. Accordingly, the position detection lights L2 do not prevent display of an image.

In the optical position detecting apparatus 10 and the display device with position detecting function 100 according to this embodiment, the plural photodetectors 30 (the first photodetector 31 and the second photodetector 32) that direct the incident angle ranges 310 and 320 to angle directions different from each other are used. Therefore, it is possible to detect the position of the target object Ob in the detection region 10R over a wide area on the screen 290 side.

In the plural photodetectors 30 (the first photodetector 31 and the second photodetector 32), the incident angle ranges 310 and 320 do not overlap each other. The position detecting device 50 detects the position of the target object Ob for each of results of detection by the plural photodetectors 30 (the first photodetector 31 and the second photodetector 32). Therefore, presence or absence and a coordinate of the target object Ob can be detected for each of the two regions 10R1 and 10R2 of the detection region 10R. Therefore, even when plural target objects Ob are present in the detection region 10R, the position of each of the plural target objects Ob can be detected. Moreover, in the plural photodetectors 30, the ends of the incident angle ranges 310 and 320 adjacent to each other are close to or in contact with each other. Therefore, it is possible to prevent a situation in which the presence of the target object Ob is overlooked.

The two photodetectors 30 (the first photodetector 31 and the second photodetector 32) are arranged to be adjacent to each other in a specific place adjacent to a side portion of the detection region 10R. Therefore, it is possible to arrange the plural photodetectors 30 in a narrow space around the detection region 10R.

Second Embodiment

Figure 7:
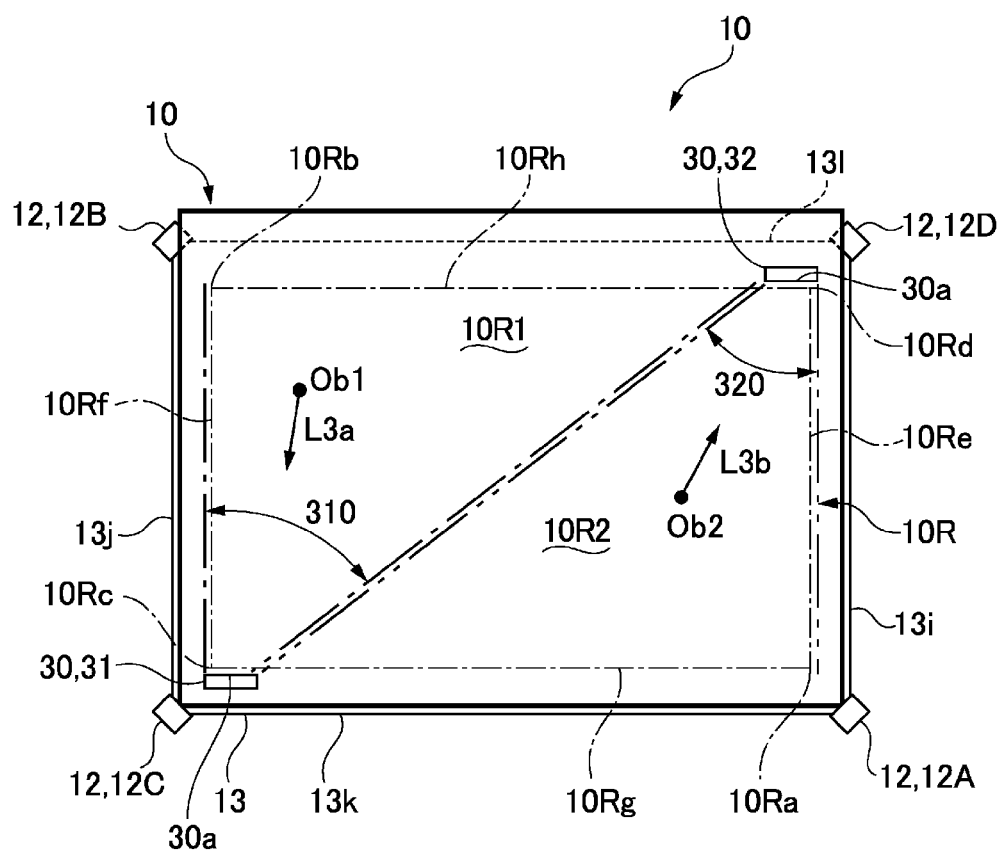
FIG. 7 is an explanatory diagram showing the configuration of an optical position detecting apparatus according to a second embodiment of the invention.

FIG. 7 is an explanatory diagram showing the configuration of the optical position detecting apparatus 10 according to a second embodiment of the invention. In FIG. 7, incident angle ranges of the photodetectors 30 used in the optical position detecting apparatus 10 according to the second embodiment of the invention are schematically shown. Since a basic configuration of this embodiment is the same as that of the first embodiment, the same components are denoted by the same reference numerals and signs and explanation of the components is omitted.

As shown in FIG. 7, in the optical position detecting apparatus 10 according to this embodiment, as in the first embodiment, the first photodetector 31 and the second photodetector 32 are used as the photodetectors 30. The two photodetectors 30 (the first photodetector 31 and the second photodetector 32) direct incident angle ranges to the different regions 10R1 and 10R2 in the detection region 10R.

When the two photodetectors 30 are arranged in this way, in the first embodiment, the detection region 10R is equally divided into the two regions 10R1 and 10R2 in the X axis direction. The incident angle ranges 310 and 320 of the first photodetector 31 and the second photodetector 32 are directed to such two regions 10R1 and 10R2. However, in the second embodiment, the detection region 10R is equally divided into the two regions 10R1 and 10R2 by a line connecting corner portions 10Rc and 10Rd located at diagonal corners of the detection region 10R. The incident angle ranges 310 and 320 of the first photodetector 31 and the second photodetector 32 are directed to such two regions 10R1 and 10R2. Specifically, the first photodetector 31 is arranged near the corner portion 10Rc in a region adjacent to the side portion 10Rg of the detection region 10R. The incident angle range 310 (a range between thick alternate long and short dash lines shown in FIG. 7) of the first photodetector 31 is directed to the region 10R1. The second photodetector 32 is arranged near the corner portion 10Rd in a region adjacent to the side portion 10Rh of the detection region 10R. The incident angle range 320 (a range between thick alternate long and two short dashes lines shown in FIG. 7) of the second photodetector 32 is directed to the region 10R2. Therefore, the first photodetector 31 detects the position detection light L3a reflected on the target object Ob1 located in the incident angle range 310 (in the region 10R1). The second photodetector 32 detects the position detection light L3b reflected on the target object Ob2 located in the incident angle range 320 (in the region 10R2).

The two regions 10R1 and 10R2 do not overlap each other. In the detection region 10R, the incident angle ranges 310 and 320 do not overlap each other. Ends of the regions 10R1 and 10R2 adjacent to each other are in contact with each other. The incident angle ranges 310 and 320 adjacent to each other are close to or in contact with each other.

With such a configuration, effects same as those in the first embodiment can be realized. For example, even when the plural target objects Ob are present in the detection region 10R, it is possible to detect the position of each of the plural target objects Ob.

Since the first photodetector 31 and the second photodetector 32 are arranged in the side portions 10Rg and 10Rh different from each other, there is an advantage that it is possible to set the incident angle ranges 310 and 320 without a space.

Third Embodiment

Figure 8:
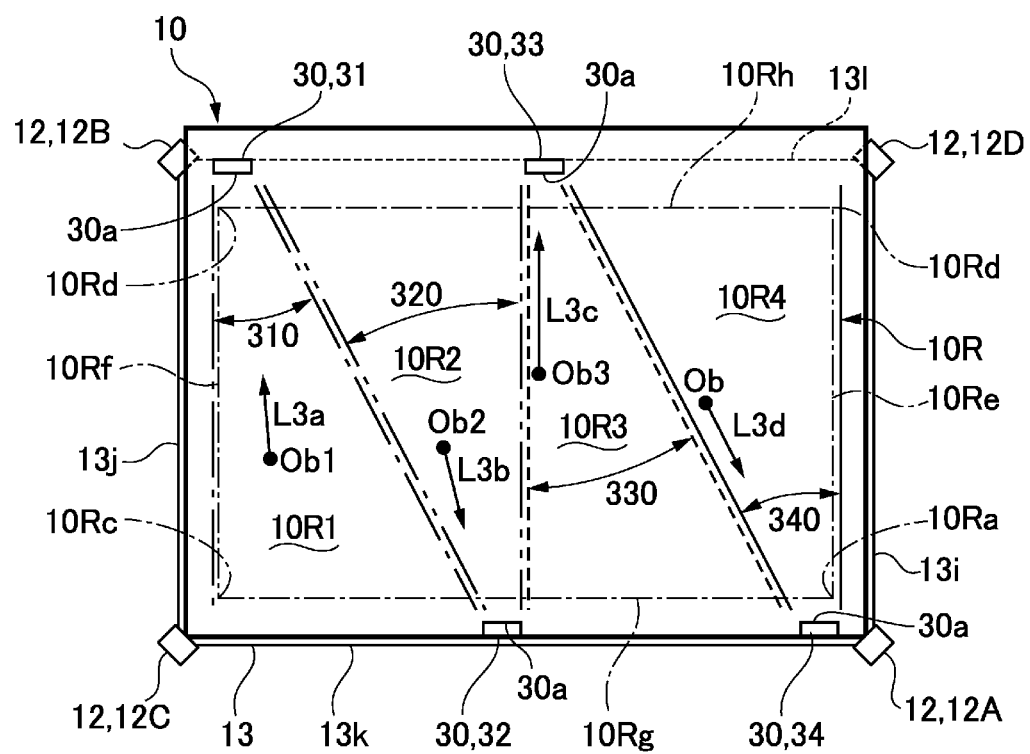
FIG. 8 is an explanatory diagram showing the configuration of an optical position detecting apparatus according to a third embodiment of the invention.

FIG. 8 is an explanatory diagram showing the configuration of the optical position detecting apparatus 10 according to a third embodiment of the invention. In FIG. 8, incident angles of the photodetectors 30 used in the optical position detecting apparatus 10 according to the third embodiment of the invention are schematically shown. Since a basic configuration of this embodiment is the same as that of the first embodiment, the same components are denoted by the same reference numerals and signs and explanation of the components is omitted.

In the first and second embodiments, the detection region 10R is equally divided into the two detection regions. However, the detection region 10R may be divided into three or more regions. For example, in the third embodiment, the detection region 10R is equally divided into four regions 10R1, 10R2, 10R3, and 10R4 in the X axis direction. The regions 10R1, 10R2, 10R3, and 10R4 have a trapezoidal shape. Oblique sides of the regions 10R1 and 10R2 are adjacent to each other and oblique sides of the regions 10R3 and 10R4 are adjacent to each other. In the optical position detecting apparatus 10 according to this embodiment, four photodetectors 30 (the first photodetector 31, the second photodetector 32, a third photodetector 33, and a fourth photodetector 34) are used as the plural photodetectors 30. The four photodetectors 30 respectively direct incident angle ranges to different regions 10R1 to 10R4 in the detection region 10R.

More specifically, the first photodetector 31 is arranged near the corner portion 10Rb in a region adjacent to the side portion 10Rh of the detection region 10R. The incident angle range 310 (a range between thick alternate long and short dash lines shown in FIG. 8) of the first photodetector 31 is directed to the region 10R1. The second photodetector 32 is arranged in the substantially center position in the X axis direction in a region adjacent to the side portion 10Rh of the detection region 10R. The incident angle range 320 (a range between thick alternate long and two dashes lines shown in FIG. 8) of the second photodetector 32 is directed to the region 10R2. The third photodetector 33 is arranged in the substantially center position in the X axis direction in a region adjacent to the side portion 10Rg of the detection region 10R. An incident angle range 330 (a range between thick dotted lines shown in FIG. 8) of the third photodetector 33 is directed to the region 10R3. The fourth photodetector 34 is arranged near the angle portion 10Ra in a region adjacent to the side portion 10Rg of the detection region 10R. An incident angle range 340 (a range between thick alternate long and short dash lines shown in FIG. 8) of the fourth photodetector 34 is directed to the region 10R4.

Therefore, the first photodetector 31 detects the position detection light L3a reflected on the target object Ob1 located in the incident angle range 310 (in the region 10R1). The second photodetector 32 detects the position detection light L3b reflected on the target object Ob2 located in the incident angle range 320 (in the region 10R2). The third photodetector 33 detects position detection light L3c reflected on a target object Ob3 located in the incident angle range 330 (in the region 10R3). The fourth photodetector 34 detects a position detection light L3d reflected on a target object Ob4 located in the incident angle range 340 (in the region 10R4).

The four regions 10R1, 10R2, 10R3, and 10R4 do not overlap one another. In the detection region 10R, the incident angle ranges 310, 320, 330, and 340 do not overlap one another. Ends of the regions 10R1 to 10R4 adjacent to each other are in contact with each other. The incident angle ranges 310 to 340 adjacent to each other are close to or in contact with each other.

With such a configuration, even when the plural target objects Ob are present in the detection region 10R, effects same as those in the first embodiment can be realized. For example, the position of each of the plural target objects Ob can be detected.

The first photodetector 31 and the third photodetector 33 are arranged in positions adjacent to the side portion 10Rh. The second photodetector 32 and the fourth photodetector 34 are arranged in positions adjacent to the side portion 10Rg. Therefore, there is an advantage that it is possible to set the incident angel ranges 310, 320, 330, and 340 without a space.

Fourth Embodiment

Figure 9A:
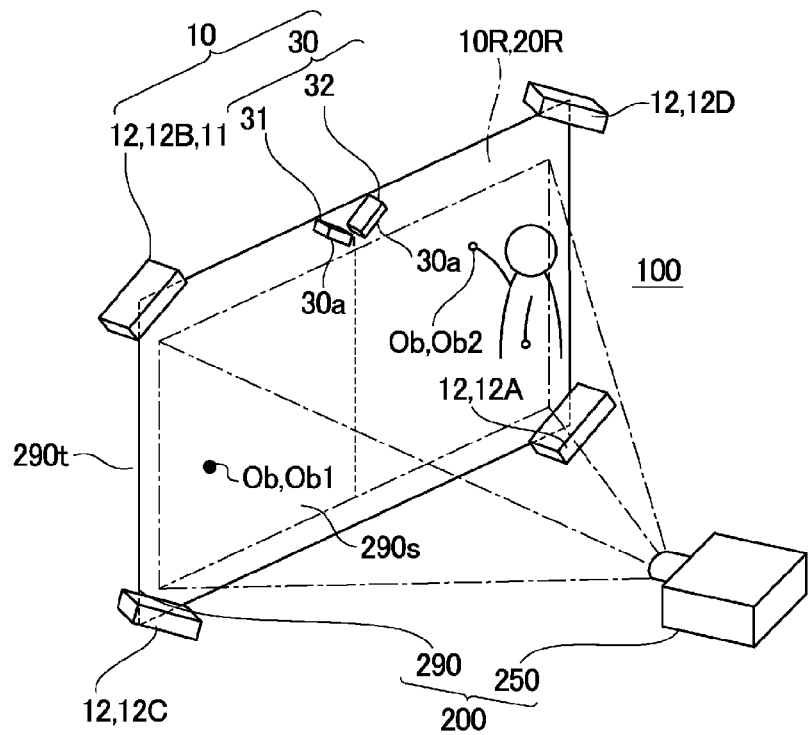
FIGS. 9A and 9B are explanatory diagrams schematically showing the configuration of an optical position detecting apparatus and a display device with position detecting function according to a fourth embodiment of the invention.
Figure 9B:
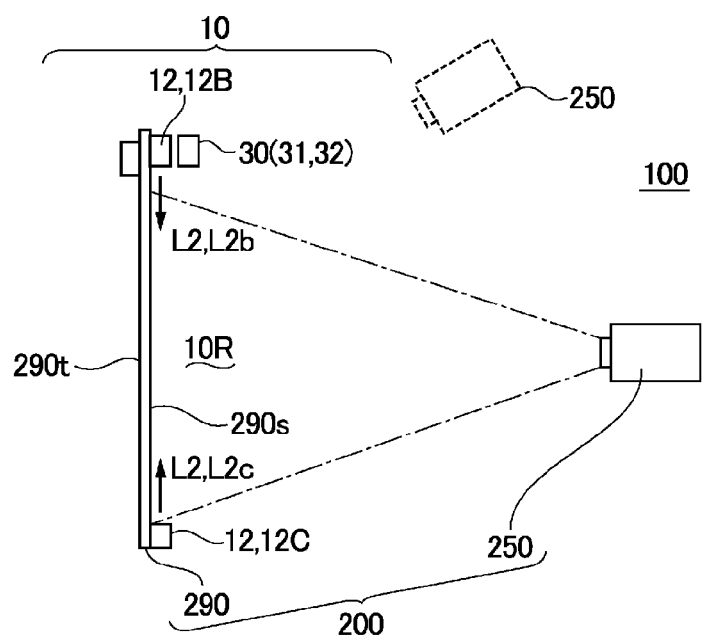

FIGS. 9A and 9B are explanatory diagrams schematically showing the configuration of the optical position detecting apparatus 10 and the display device with position detecting function 100 according to a fourth embodiment of the invention. FIG. 9A is an explanatory diagram schematically showing a state in which a main part of the display device with position detecting function 100 is viewed from obliquely above. FIG. 9B is an explanatory diagram schematically showing a state in which the display device with position detecting function 100 is viewed from a lateral direction. Since a basic configuration of this embodiment is the same as that of the first embodiment, the same components are denoted by the same reference numerals and signs and explanation of the components is omitted.

In the first to third embodiments, the light sources for position detection 12 and the light guide plate 13 of the optical position detecting apparatus 10 are arranged on the rear side 290t of the screen member 290. However, in the fourth embodiment, the light sources for position detection 12 (the light sources for position detection 12A to 12D) are arranged on the screen surface 290s side of the screen member 290. Such light sources for position detection 12 face light emitting sections thereof to directions along the screen 290a on an outer side of the detection region 10R. Therefore, in this embodiment, a light guide plate is not used. As in the first embodiment, the photodetectors 30 face the light receiving units 30a to the directions along the screen surface 290s on the outer side of the detection region 10R on the screen surface 290s side of the screen member 290.

In the optical position detecting apparatus 10 and the display device with position detecting function 100 having such a configuration, if the invention is applied, even when the plural target objects Ob are present in the detection region 10R, effects same as those of the first embodiment can be realized. For example, the position of each of the plural target objects Ob can be detected.

Fifth Embodiment

Figure 10A:
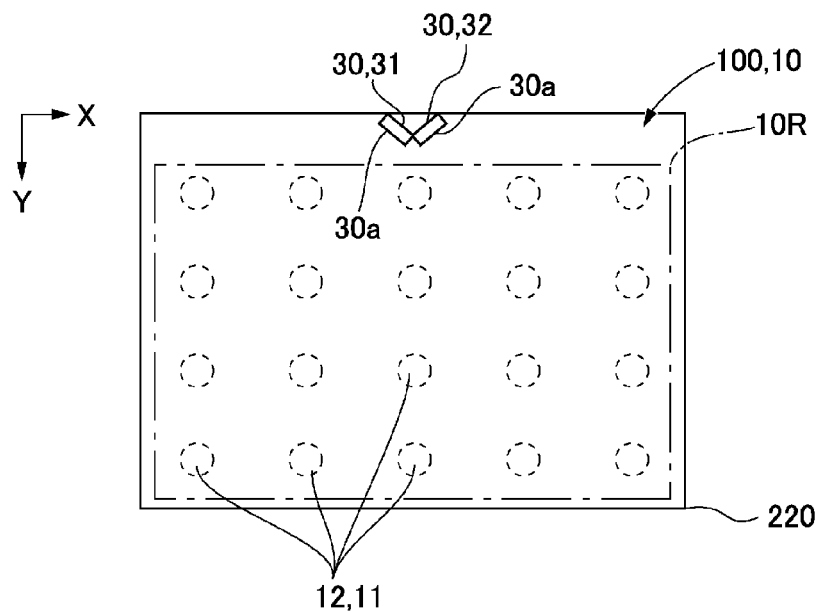
FIGS. 10A and 10B are explanatory diagrams schematically showing the configuration of an optical position detecting apparatus and a display device with position detecting function according to a fifth embodiment of the invention.
Figure 10B:
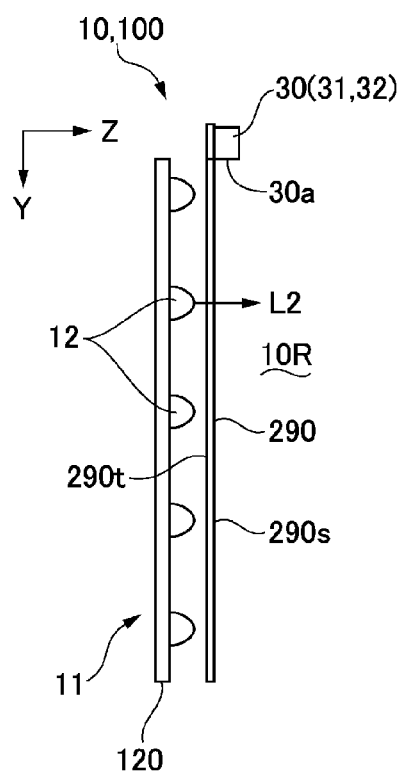

FIGS. 10A and 10B are explanatory diagrams schematically showing the configuration of the optical position detecting apparatus 10 and the display device with position detecting function 100 according to a fifth embodiment of the invention. FIG. 10A is an explanatory diagram schematically showing a state in which a main part of the display device with position detecting function 100 is viewed from obliquely above. FIG. 10B is an explanatory diagram schematically showing a state in which the display device with position detecting function 100 is viewed from a lateral direction. Since a basic configuration of this embodiment is the same as that of the first embodiment, the same components are denoted by the same reference numerals and signs and explanation of the components is omitted.

In the first to third embodiments, the light sources for position detection 12 and the light guide plate 13 of the optical position detecting apparatus 10 are arranged on the rear side 290t of the screen member 290. However, in the light source device for position detection 11 of the optical position detecting apparatus 10 according to the fifth embodiment, as shown in FIGS. 10A and 10B, a substrate 120 on which the plural light sources for position detection 12 are arrayed is provided in a position opposed to the detection region 10R in the Z axis direction on the rear side 290t of the screen member 290. Therefore, a light guide plate is not provided.

In the optical position detecting apparatus 10 and the display device with position detecting function 100 having such a configuration, if the invention is applied, even when the plural target objects Ob are present in the detection region 10R, effects same as those of the first embodiment can be realized. For example, the position of each of the plural target objects Ob can be detected.

Another Embodiment

In the embodiments explained above, the optical position detecting apparatus 10 is provided in a projection display apparatus as the display device 100 with position detecting function. However, the display device with position detecting function 100 may be configured by providing the optical position detecting apparatus 10 in an electronic blackboard including a screen member.

Modifications of the Display Device with Position Detecting Function 100

In the examples explained in the embodiments explained above, the display device with position detecting function 100 is mounted on the projection display apparatus and the electronic blackboard. However, as shown in FIGS. 11 to FIGS. 14A and 14B, if a direct-view display device is adopted as the image generating device 200, the display device with position detecting function 100 can be used in electronic apparatuses explained later with reference to FIGS. 15A to 15C.

First Modification of the Display Device with Position Detecting Function 100

Figure 11:
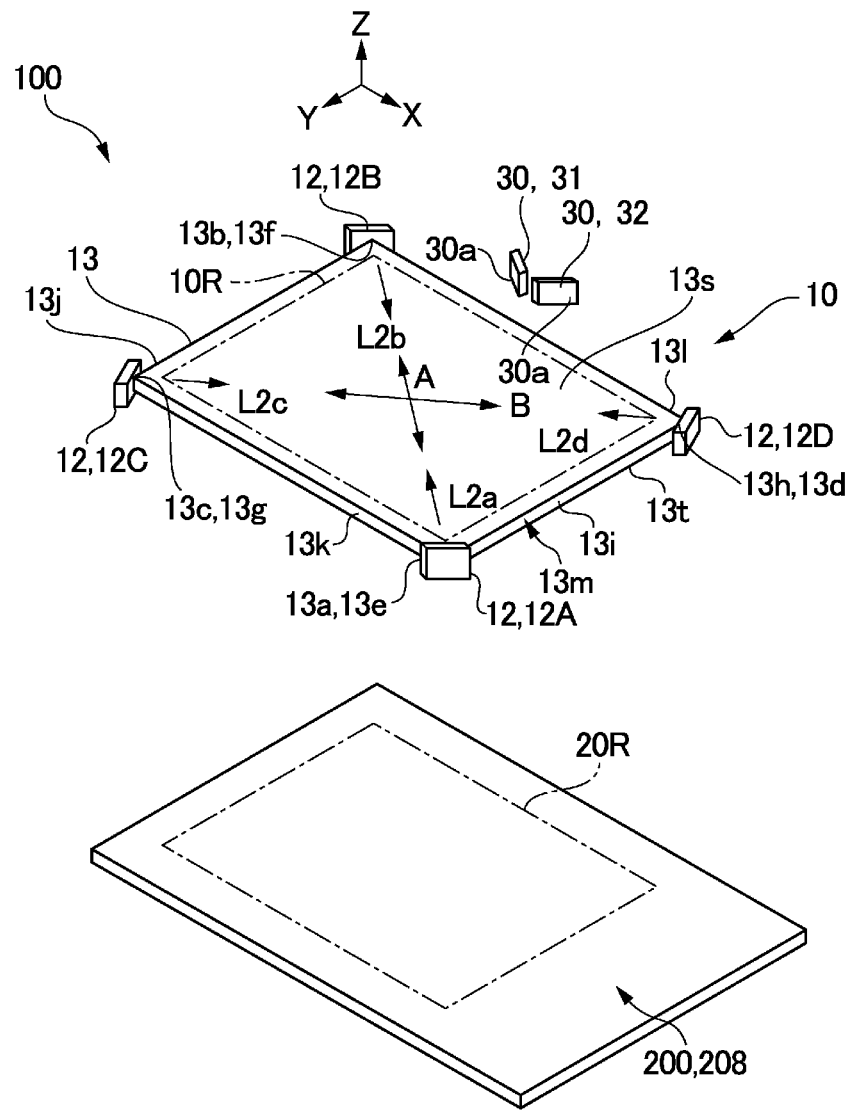
FIG. 11 is a disassembled perspective view of an optical position detecting apparatus and a display device with position detecting function according to a first modification of the embodiments of the invention.
Figure 12:
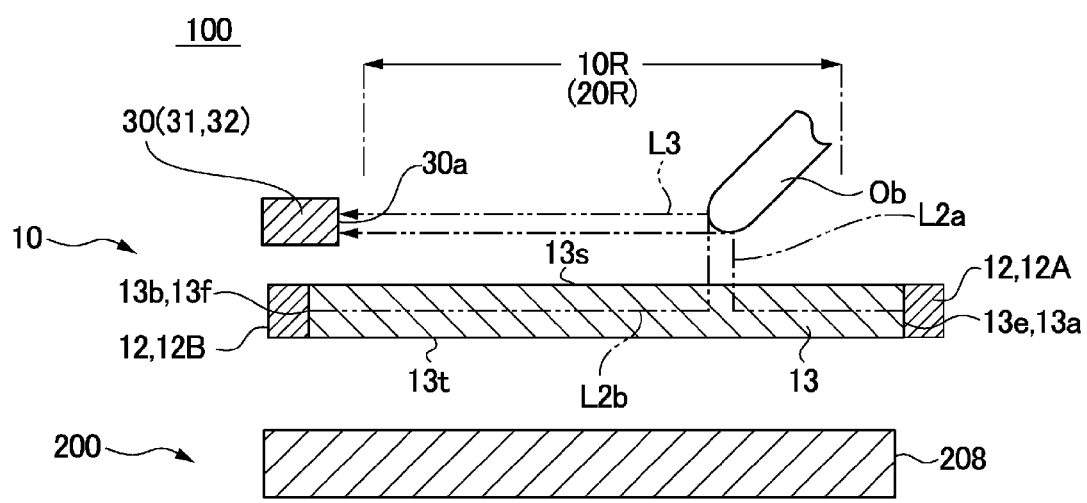
FIG. 12 is an explanatory diagram showing sectional configuration of the optical position detecting apparatus and the display device with position detecting function according to the first modification of the embodiments of the invention.

FIG. 11 is a disassembled perspective view of the optical position detecting apparatus 10 and the display device with position detecting function 100 according to a first modification of the embodiments. FIG. 12 is an explanatory diagram showing a sectional configuration of the optical position detecting apparatus 10 and the display device with position detecting function 100 according to a first modification of the invention. In the display device with position detecting function 100 according to this modification, since the configuration of the optical position detecting apparatus 10 is the same as that in the embodiments explained above, the same components are denoted by the same reference numerals and signs and explanation of the components is omitted.

The display device with position detecting function 100 shown in FIGS. 11 and 12 includes the optical position detecting apparatus 10 and the image generating device 200. The optical position detecting apparatus 10 includes the light sources for position detection 12 that emit position detection lights, the light guide plate 13, and the plural photodetectors 30 including the light receiving units 30a faced to the detection region 10R. The image generating device 200 is a direct-view display device 208 such as an organic electroluminescence device or a plasma display device. The image generating device 200 is provided on the opposite side of the input operation side with respect to the optical position detecting apparatus 10. The direct-view display device 208 includes the image display region 20R in a region overlapping the light guide plate 13 in plan view. Such an image display region 20R overlaps the detection region 10R in plan view.

Second Modification of the Display Device with Position Detecting Function 100

Figure 13:
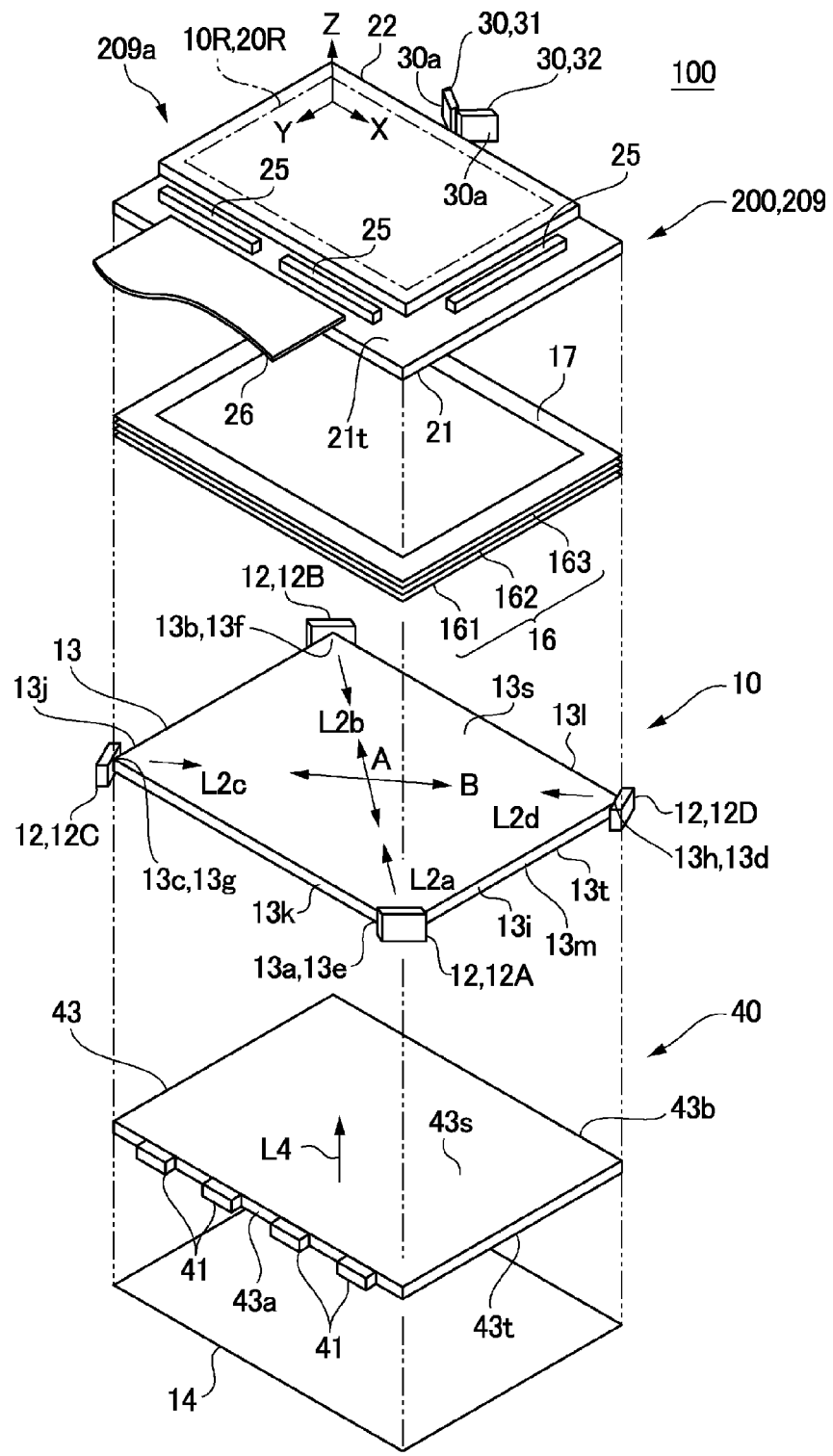
FIG. 13 is a disassembled perspective view of an optical position detecting apparatus and a display device with position detecting function according to a second modification of the embodiments of the invention.
Figure 14A:
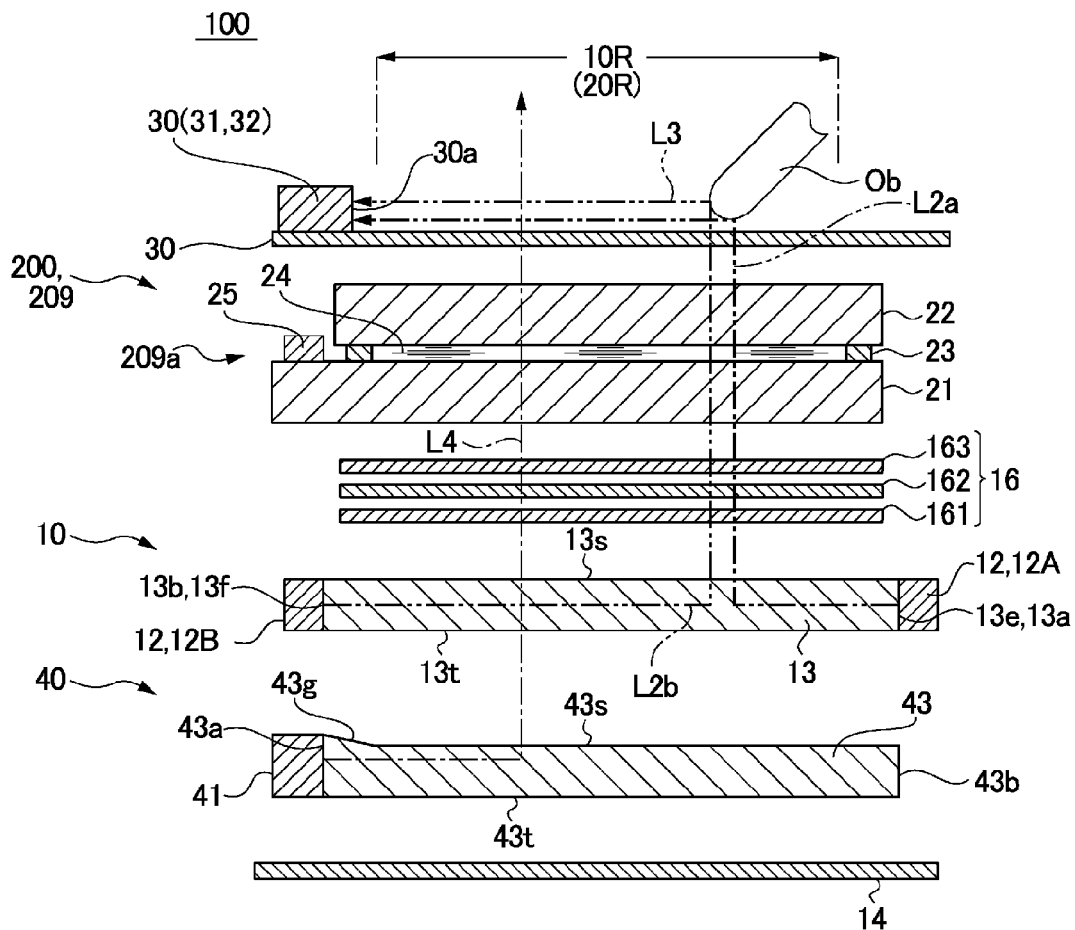
FIGS. 14A and 14B are explanatory diagrams showing sectional configuration of the optical position detecting apparatus and the display device with position detecting function according to the second modification of the embodiments of the invention.
Figure 14B:
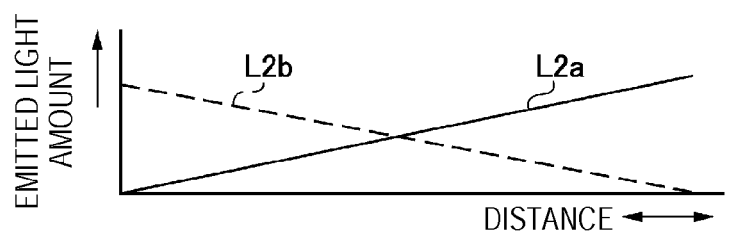

FIG. 13 and FIGS. 14A and 14B are explanatory diagrams of the optical position detecting apparatus 10 and the display device with position detecting function 100 according to a second modification of the embodiments. FIG. 13 is a disassembled perspective view of the optical position detecting apparatus 10 and the display device with position detecting function 100. FIGS. 14A and 14B are explanatory diagrams showing a sectional configuration of the optical position detecting apparatus 10 and the display device with position detecting function 100. In the display device with position detecting function 100 according to this modification, since the configuration of the optical position detecting apparatus 10 is the same as that in the embodiments explained above, the same components are denoted by the same reference numerals and signs and explanation of the components is omitted.

The display device with position detecting function 100 shown in FIG. 13 and FIGS. 14A and 14B includes the optical position detecting apparatus 10 and the image generating device 200. The optical position detecting apparatus 10 includes the light sources for position detection 12 that emit position detection lights, the light guide plate 13, and the plural photodetectors 30 including the light receiving units 30a faced to the detection region 10R. The image generating device 200 includes a liquid crystal device 209 as a direct-view display device and a translucent cover member 30. The liquid crystal device 209 includes the image display region 20R in a region overlapping the light guide plate 13 in plan view. Such an image display region 20R overlaps the detection region 10R in plan view.

In the display device with position detecting function 100 according to this modification, an optical sheet 16 for realizing uniformalization of the position detection lights L2a to L2d is arranged on a light emission side of the light guide plate 13 according to necessity. In this modification, as the optical sheet 16, a first prism sheet 161 opposed to the light emission surface 13s of the light guide plate 13, a second prism sheet 162 opposed to the first prism sheet 161 on the opposite side of a side on which the light guide plate 13 is located, and a light scattering plate 163 opposed to the second prism sheet 162 on the opposite side of the side on which the light guide plate 13 is located. A light blocking sheet 17 having a rectangular frame shape is arranged around the optical sheet 16 on the opposite side of the side on which the light guide plate 13 is located with respect to the optical sheet 16. Such a light blocking sheet 17 prevents the position detection lights L2a to L2d, which are emitted from the light sources for position detection 12A to 12D, from leaking.

The liquid crystal device 209 (the image generating device 200) includes a liquid crystal panel 209a on the opposite side of the side on which the light guide plate 13 is located with respect to the optical sheet 16 (the first prism sheet 161, the second prism sheet 162, and the light scattering plate 163). In this modification, the liquid crystal panel 209a is a transmissive liquid crystal panel. The liquid crystal panel 209a has structure in which two translucent substrates 21 and 22 are bonded by a seal member 23 and liquid crystal 24 is filled between the substrates. In this modification, the liquid crystal panel 209a is an active matrix liquid crystal panel. A translucent pixel electrode, a data line, a scanning line, and a pixel switching element (not shown) are formed on one side of the two translucent substrates 21 and 22. A translucent common electrode (not shown) is formed on the other side. In some case, the pixel electrode and the common electrode are formed on the same substrate. In such a liquid crystal panel 209a, when scanning signals are output to pixels via the scanning line and image signals are output via the data line, orientation of the liquid crystal 24 is controlled in each of the plural pixels. As a result, an image is formed in the image display region 20R.

In the liquid crystal panel 209a, on one translucent substrate 21, a substrate projecting section 21t further projecting outward than the external shape of the other translucent substrate 22 is provided. Electronic components 25 included in a driving circuit and the like are mounted on the surface of the substrate projecting section 21t. A wiring member 26 such as a flexible wiring board (FPC) is connected to the substrate projecting section 21t. Only the wiring member 26 may be mounted on the substrate projecting section 21t. Sheet polarizers (not shown) are arranged on the outer surface sides of the translucent substrates 21 and 22 according to necessity.

To detect a plane position of the target object Ob, it is necessary to emit the position detection lights L2a to L2d to a visual recognition side on which operation by the target object Ob is performed. The liquid crystal panel 209a is arranged further on the visual recognition side (the operation side) than the light guide plate 13 and the optical sheet 16. Therefore, in the liquid crystal panel 209a, the image display region 20R is configured to be capable of transmitting the position detection lights L2a to L2d. When the liquid crystal panel 209a is arranged on the opposite side of the visual recognition side of the light guide plate 13, the image display region 20R does not need to be configured to transmit the position detection lights L2a to L2d. Instead, the image display region 20R needs to be configured to be capable of being seen from the visual recognition side through the light guide plate 13.

The liquid crystal device 209 includes an illuminating device 40 for illuminating the liquid crystal panel 209a. In this modification, the illuminating device 40 is arranged between the light guide plate 13 and the reflection plate 14 on the opposite side of a side on which the liquid crystal panel 209a is located with respect to the light guide plate 13. The illuminating device 40 includes a light source for illumination 41 and a light guide plate for illumination 43 that emits illumination light, which are emitted from the light source for illumination 41, while propagating the illumination light. The light guide plate for illumination 43 has a rectangular plane shape. The light source for illumination 41 includes a light emitting element such as an LED (light emitting diode). The light source for illumination 41 emits, for example, white illumination light L4 according to a driving signal output from a driving circuit (not shown). In this modification, plural light sources for illumination 41 are arrayed along a side portion 43a of the light guide plate for illumination 43.

In the light guide plate for illumination 43, an inclined surface 43g is provided on a surface portion on a light emission side adjacent to the side portion 43a (an outer peripheral portion on the side portion 43a side of a light emission surface 43s). The thickness of the light guide plate for illumination 43 gradually increases toward the side portion 43a. The height of the side portion 43a is set to correspond to the height of a light emission surface of the light source for illumination 41 while an increase in the thickness of a portion where the light emission surface 43s is provided is suppressed by a light entrance structure having such an inclined surface 43g.

In such an illuminating device 40, illumination light emitted from the light source for illumination 41 is made incident on the inside of the light guide plate for illumination 43 from the side portion 43a of the light guide plate for illumination 43. Then, the illumination light is propagated to an outer edge portion 43b on the opposite side on the inside of the light guide plate for illumination 43 and emitted from the light emission surface 43s, which is one surface of the light guide plate for illumination 43. The light guide plate for illumination 43 has a light guide structure in which a light amount ratio of emitted light from the light emission surface 43a with respect to the light propagated on the inside from the side portion 43a side to the outer edge portion 43b on the opposite side monotonously increases. Such a light guide structure is realized by gradually increasing, toward a direction in which the illumination light is propagated on the inside, for example, an area of a refractive surface having a fine roughness shape for light deflection or light scattering formed on the light emission surface 43s or a rear surface 43t of the light guide plate for illumination 43 or formation density of a printed scattering layer. By providing such a light guide structure, the illumination light L4 made incident from the side portion 43a is substantially uniformly emitted from the light emission surface 43s.

In this modification, the light guide plate for illumination 43 is arranged to two-dimensionally overlap the image display region 20R of the liquid crystal panel 209a on the opposite side of the visual recognition side of the liquid crystal panel 209a. The light guide plate for illumination 43 functions as a so-called backlight. However, the light guide plate for illumination 43 may be arranged on the visual recognition side of the liquid crystal panel 209a and configured to function as a so-called front light. In this modification, the light guide plate for illumination 43 is arranged between the light guide plate 13 and the reflection plate 14. However, the light guide plate for illumination 43 may be arranged between the optical sheet 16 and the light guide plate 13. The light guide plate for illumination 43 and the light guide plate 13 may be formed as a common light guide plate. In this modification, the optical sheet 16 is commonly used for the position detection lights L2a to L2d and the illumination light L4. However, an optical sheet for exclusive use different from the optical sheet 16 may be arranged on the light emission side of the light guide plate for illumination 43. In the light guide plate for illumination 43, a light scattering plate that presents a sufficient light scattering action is often used for the purpose of uniformalizing plane luminance of the illumination light L4 emitted from the light emission surface 43s. However, in the light guide plate 13 for position detection, if the position detection lights L2a to L2d emitted from the light emission surface 13s are largely scattered, position detection is prevented. Therefore, since it is necessary to not provide the light scattering plate or to use a light scattering plate that presents a relatively mild light scattering action, the light scattering plate may be a product exclusively used for the light guide plate for illumination 43. However, an optical sheet having a light condensing action such as a prism sheet (the first prism sheet 161 and the second prism sheet 162) may be commonly used for the light guide plate 13 and the light guide plate for illumination 43.

Examples of Mounting on an Electronic Apparatus

Figure 15A:
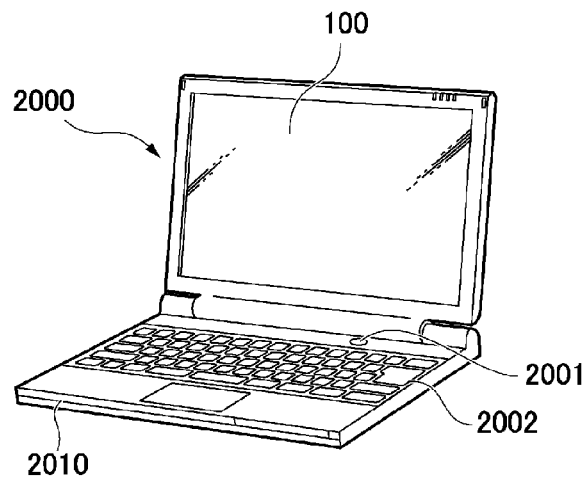
FIGS. 15A to 15C are explanatory diagrams of electronic apparatuses including the display device with position detecting function according to the modifications of the embodiments of the invention.
Figure 15B:
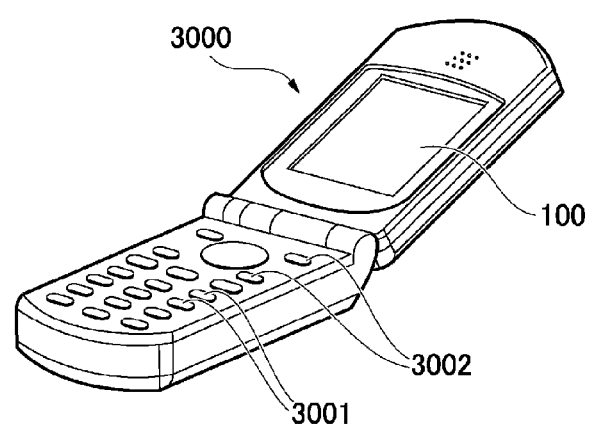
Figure 15C:
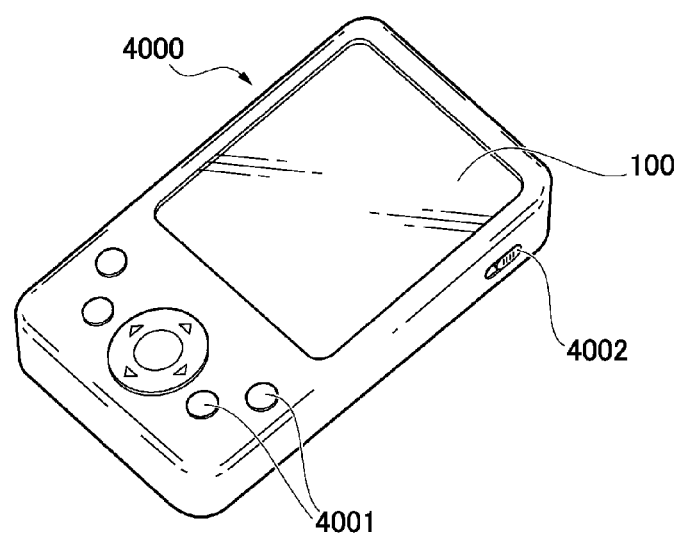
Figure 16A:
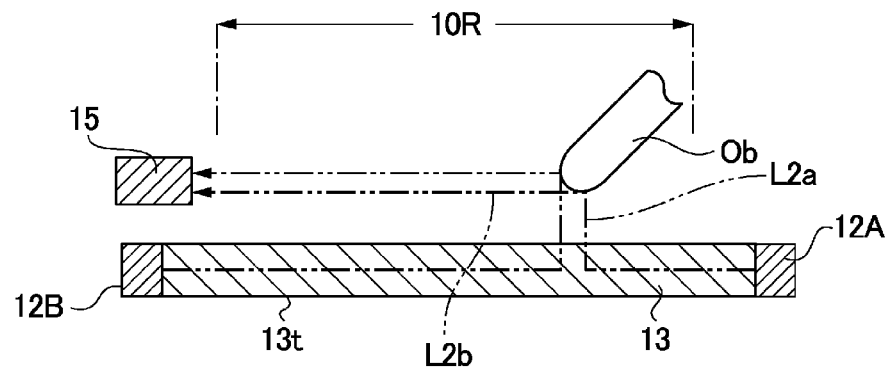
FIGS. 16A and 16B are explanatory diagrams of an optical position detecting apparatus according to a reference example of the invention.
Figure 16B:
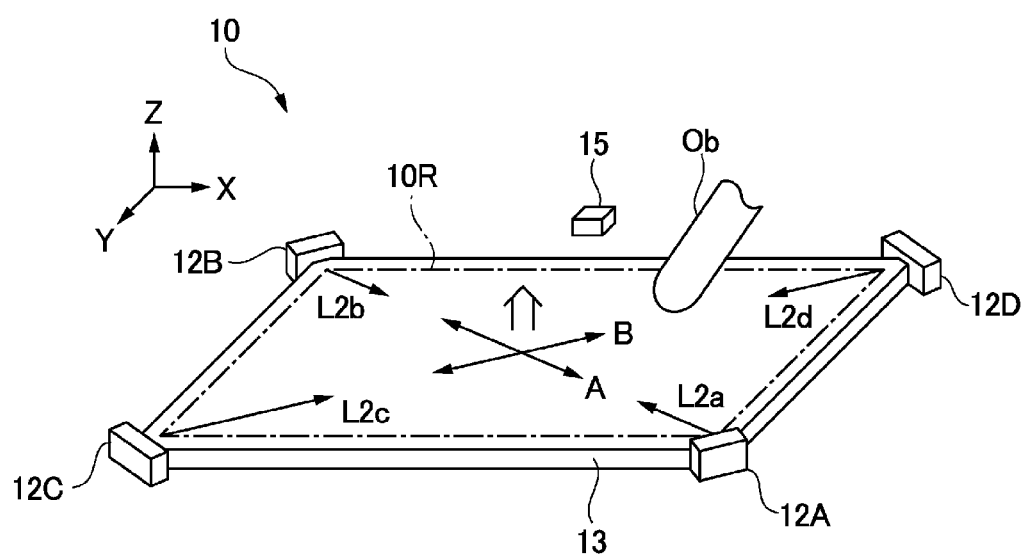

Electronic apparatuses mounted with the display device with position detecting function 100 explained with reference to FIGS. 11 to FIGS. 14A and 14B are explained with reference to FIGS. 15A to 15C. FIGS. 15A to 15C are explanatory diagrams of electronic apparatuses including the display device with position detecting function according to the modifications explained above. In FIG. 15A, the configuration of a mobile personal computer including the display device with position detecting function 100 is shown. A personal computer 2000 includes the display device with position detecting function 100 as a display unit and a main body unit 2010. In the main body unit 2010, a power switch 2001 and a keyboard 2002 are provided. In FIG. 15B, the configuration of a cellular phone including the display device with position detecting function 100 is shown. A cellular phone 3000 includes plural operation buttons 3001, scroll buttons 3002, and the display device with position detecting function 100 as a display unit. A user operates the scroll buttons 3002 to thereby scroll a screen displayed on the display device with position detecting function 100. In FIG. 15C, the configuration of a personal digital assistant (PDA) mounted with the display device with position detecting function 100 is shown. A personal digital assistant 4000 includes plural operation buttons 4001, a power switch 4002, and the display device with position detecting function 100 as a display unit. When a user operates the power switch 4002, various kinds of information such as an address book and a schedule book are displayed on the display device with position detecting function 100.

Examples of the electronic apparatuses mounted with the display device with position detecting function 100 include, besides the electronic apparatuses shown in FIGS. 15A to 15C, electronic apparatuses such as a digital still camera, a liquid crystal television, video tape recorders of a view-finder type and a monitor direct-view type, a car navigation system, a pager, an electronic notebook, an electric calculator, a word processor, a work station, a video telephone, a POS terminal, and a bank terminal. As display units of these electronic apparatuses, the display device with position detecting function 100 can be applied.

The disclosure of Japanese Patent Application No. 2009-245196, filed Oct. 26, 2009 is expressly incorporated by reference herein.

What is claimed is:

1. An optical position detecting apparatus that detects a position of a target object in a detection region, which is adjacent to a display member, the optical position detecting apparatus comprising:
 a light source device that emits position detection light to the detection region and forms first and second intensity distributions of the position detection light in the detection region, the light source device being mounted on the display member;
 plural photodetectors that direct incident angle ranges to regions, which are different from each other, in the detection region, the plural photodetectors being provided adjacent to the display member, each of the plural photodetectors detecting a first amount of reflected light that is generated when the position detection light having the first intensity distribution is reflected by the target object and a second amount of the reflected light that is generated when the position detection light having the second intensity distribution is reflected by the target object; and
 a position detecting device that detects the position of the target object on the basis of the first and second amounts of the reflected light detected by the plural photodetectors, wherein
 intensities of each of the first and second intensity distributions of the position detection light in the detection region are continuously different from each other in a first direction perpendicular to a position detection light emitting direction, and the first intensity distribution is different from the second intensity distribution, and
 the first and second amounts of the reflected light detected by the plural photodetectors are respectively in proportion to the first and second intensity distributions so that the position detecting device detects the position of the target object in accordance with a difference between the first amount and the second amount of the reflected light.

2. The optical position detecting apparatus according to claim 1, wherein ends of the incident angle ranges adjacent to each other are close to or in contact with each other in the plural photodetectors.

3. The optical position detecting apparatus according to claim 1, wherein the plural photodetectors include incident-angle-range limiting units that specify the incident angle ranges.

4. The optical position detecting apparatus according to claim 1, wherein the position detection light includes infrared light.

5. A display device with position detecting function including the optical position detecting apparatus according to claim 1, the display device with position detecting function comprising an image generating device that forms an image in the display member overlapping the detection region.

6. The optical position detecting apparatus according to claim 1, wherein the light source device for position detection forms the first intensity distribution for first coordinate detection in which the intensity of the position detection light changes in the first direction and a third intensity distribution for second coordinate detection in which the intensity of the position detection light changes in a second direction crossing the first direction.

7. The optical position detecting apparatus according to claim 6, wherein the light source device for position detection forms a fourth intensity distribution for third coordinate detection in which the intensity of the position detection light changes in a direction crossing both the first and second directions.

* * * * *